(12) United States Patent
Ng et al.

(10) Patent No.: US 11,108,473 B2
(45) Date of Patent: Aug. 31, 2021

(54) METHODS FOR TERMINAL-SPECIFIC BEAMFORMING ADAPTATION FOR ADVANCED WIRELESS SYSTEMS

(71) Applicant: Samsung Electronics Co., Ltd., Suwon-si (KR)

(72) Inventors: Boon Loong Ng, Plano, TX (US); Jianzhong Zhang, Plano, TX (US); Jin Cao, Richardson, TX (US); Joonyoung Cho, Plano, TX (US)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

(21) Appl. No.: 16/270,437

(22) Filed: Feb. 7, 2019

(65) Prior Publication Data
US 2019/0379464 A1    Dec. 12, 2019

Related U.S. Application Data

(60) Provisional application No. 62/683,315, filed on Jun. 11, 2018, provisional application No. 62/716,478, filed on Aug. 9, 2018, provisional application No. 62/719,872, filed on Aug. 20, 2018, provisional application No. 62/740,584, filed on Oct. 3, 2018.

(51) Int. Cl.
*H04B 17/11* (2015.01)
*H04B 7/06* (2006.01)

(52) U.S. Cl.
CPC ........... *H04B 17/11* (2015.01); *H04B 7/0617* (2013.01)

(58) Field of Classification Search
CPC ...................................................... H04B 17/11
USPC ......................................................... 455/418
See application file for complete search history.

(56) References Cited

U.S. PATENT DOCUMENTS

| 2013/0017836 | A1 | 1/2013 | Chang et al. |
| 2013/0107977 | A1 | 5/2013 | Lakkis |
| 2013/0315192 | A1 | 11/2013 | Seo |
| 2016/0198474 | A1 | 7/2016 | Raghavan et al. |
| 2018/0302138 | A1* | 10/2018 | Shirakata ............. H04B 7/0695 |

(Continued)

FOREIGN PATENT DOCUMENTS

| EP | 3293890 A1 | 3/2018 |
| WO | 2017184190 A1 | 10/2017 |

(Continued)

OTHER PUBLICATIONS

International Search Report dated Sep. 18, 2019 in connection with International Patent Application No. PCT/KR2019/006950, 4 pages.

(Continued)

*Primary Examiner* — Chuck Huynh

(57) ABSTRACT

A method of user equipment (UE) in a wireless communication system is provided. The method comprises providing an indicia to instruct placement of the UE in a beam training condition, in response to identifying placement of the UE in the beam training condition, performing a beam codebook training including identifying beam usage rate statistics, and generating a beam codebook for a beam generation of an antenna array of the UE for the beam training condition based on the identified beam usage rate statistics, the beam codebook including a UE-specific sub-codebook.

20 Claims, 27 Drawing Sheets

(56) References Cited

U.S. PATENT DOCUMENTS

2018/0343043 A1\* 11/2018 Hakola ................ H04B 7/0417
2019/0044756 A1\* 2/2019 Zhao ................... H04L 25/0204

FOREIGN PATENT DOCUMENTS

WO  2018/071026 A1  4/2018
WO  2019/177419 A1  9/2019

OTHER PUBLICATIONS

Written Opinion of the International Searching Authority dated Sep. 18, 2019 in connection with International Patent Application No. PCT/KR2019/006950, 4 pages.
Extended European Search Report dated May 12, 2021 regarding Application No. 19819585.1, 11 pages.
Lim et al., Efficient Beam Training and Channel Estimation for Millimeter Wave Communications Under Mobility, arXiv:1804.07973, Apr. 2018, 33 pages.

\* cited by examiner

METHODS FOR TERMINAL-SPECIFIC BEAMFORMING ADAPTATION FOR ADVANCED WIRELESS SYSTEMS

CROSS-REFERENCE TO RELATED APPLICATION(S) AND CLAIM OF PRIORITY

The present application claims priority to:
U.S. Provisional Patent Application Ser. No. 62/683,315, filed on Jun. 11, 2018;
U.S. Provisional Patent Application Ser. No. 62/716,478, filed on Aug. 9, 2018;
U.S. Provisional Patent Application Ser. No. 62/719,872, filed on Aug. 20, 2018; and
U.S. Provisional Patent Application Ser. No. 62/740,584, filed on Oct. 3, 2018.
The content of the above-identified patent documents are incorporated herein by reference.

TECHNICAL FIELD

The present application relates generally to beam management. More specifically, this disclosure relates to terminal-specific beamforming adaptation for advanced wireless communication systems.

BACKGROUND

In a wireless communication network, a network access and a radio resource management (RRM) are enabled by physical layer synchronization signals and higher (MAC) layer procedures. In particular, a user equipment (UE) attempts to detect the presence of synchronization signals along with at least one cell identification (ID) for initial access. Once the UE is in the network and associated with a serving cell, the UE monitors several neighboring cells by attempting to detect their synchronization signals and/or measuring the associated cell-specific reference signals (RSs). For next generation cellular systems such as third generation partnership-new radio access or interface (3GPP-NR), efficient and unified radio resource acquisition or tracking mechanism which works for various use cases such as enhanced mobile broadband (eMBB), ultra reliable low latency (URLLC), massive machine type communication (mMTC), each corresponding to a different coverage requirement and frequency bands with different propagation losses is desirable.

SUMMARY

Embodiments of the present disclosure provide terminal-specific beamforming adaptation for advanced wireless systems.

In one embodiment, a user equipment (UE) in a wireless communication system is provided. The UE comprises a display and a processor operably connected to the display, the processor configured to provide an indicia to instruct placement of the UE in a beam training condition, in response to identifying placement of the UE in the beam training condition, perform a beam codebook training including identifying beam usage rate statistics, and generate a beam codebook for a beam generation of an antenna array of the UE for the beam training condition based on the identified beam usage rate statistics, the beam codebook including a UE-specific sub-codebook.

In another embodiment, a method of user equipment (UE) in a wireless communication system is provided. The method comprises providing an indicia to instruct placement of the UE in a beam training condition, in response to identifying placement of the UE in the beam training condition, performing a beam codebook training including identifying beam usage rate statistics, and generating a beam codebook for a beam generation of an antenna array of the UE for the beam training condition based on the identified beam usage rate statistics, the beam codebook including a UE-specific sub-codebook.

In yet another embodiment, a non-transitory computer readable medium comprising instructions is provided. When executed by at least one processor of a user equipment (UE), the instructions cause the UE to provide an indicia to instruct placement of the UE in a beam training condition, in response to identifying placement of the UE in the beam training condition, perform a beam codebook training including identifying beam usage rate statistics, and generate a beam codebook for a beam generation of an antenna array of the UE for the beam training condition based on the identified beam usage rate statistics, the beam codebook including a UE-specific sub-codebook.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIG. 1 through FIG. 34, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

To meet the demand for wireless data traffic having increased since deployment of 4G communication systems, efforts have been made to develop an improved 5G or pre-5G communication system. Therefore, the 5G or pre-5G communication system is also called a "beyond 4G network" or a "post LTE system."

The 5G communication system is considered to be implemented in higher frequency (mmWave) bands, e.g., 60 GHz bands, so as to accomplish higher data rates. To decrease propagation loss of the radio waves and increase the transmission coverage, the beamforming, massive multiple-input multiple-output (MIMO), full dimensional MIMO (FD-MIMO), array antenna, an analog beam forming, large scale antenna techniques and the like are discussed in 5G communication systems.

In addition, in 5G communication systems, development for system network improvement is under way based on advanced small cells, cloud radio access networks (RANs), ultra-dense networks, device-to-device (D2D) communication, wireless backhaul communication, moving network, cooperative communication, coordinated multi-points (CoMP) transmission and reception, interference mitigation and cancellation and the like.

Figure 1:
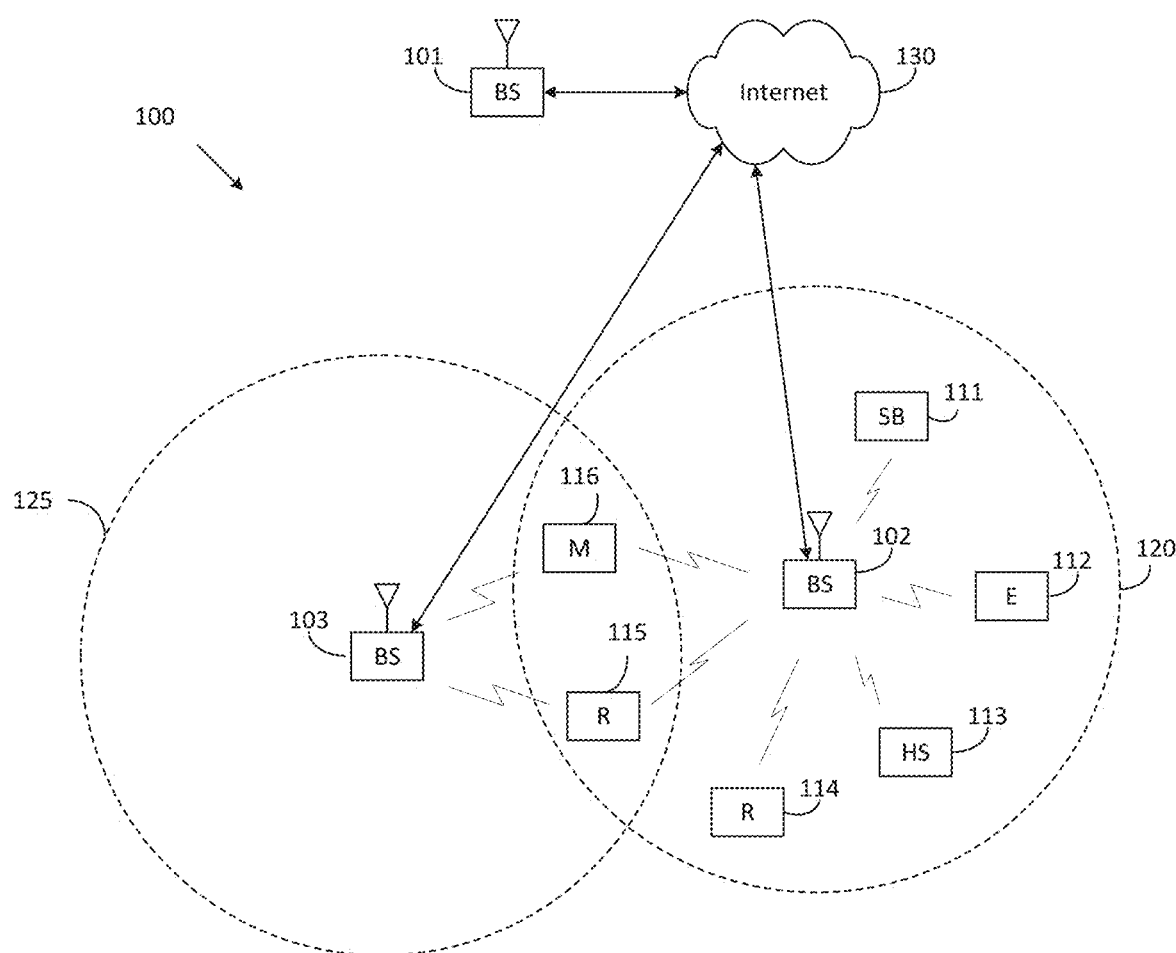
FIG. 1 illustrates an example wireless network according to embodiments of the present disclosure.
Figure 2:
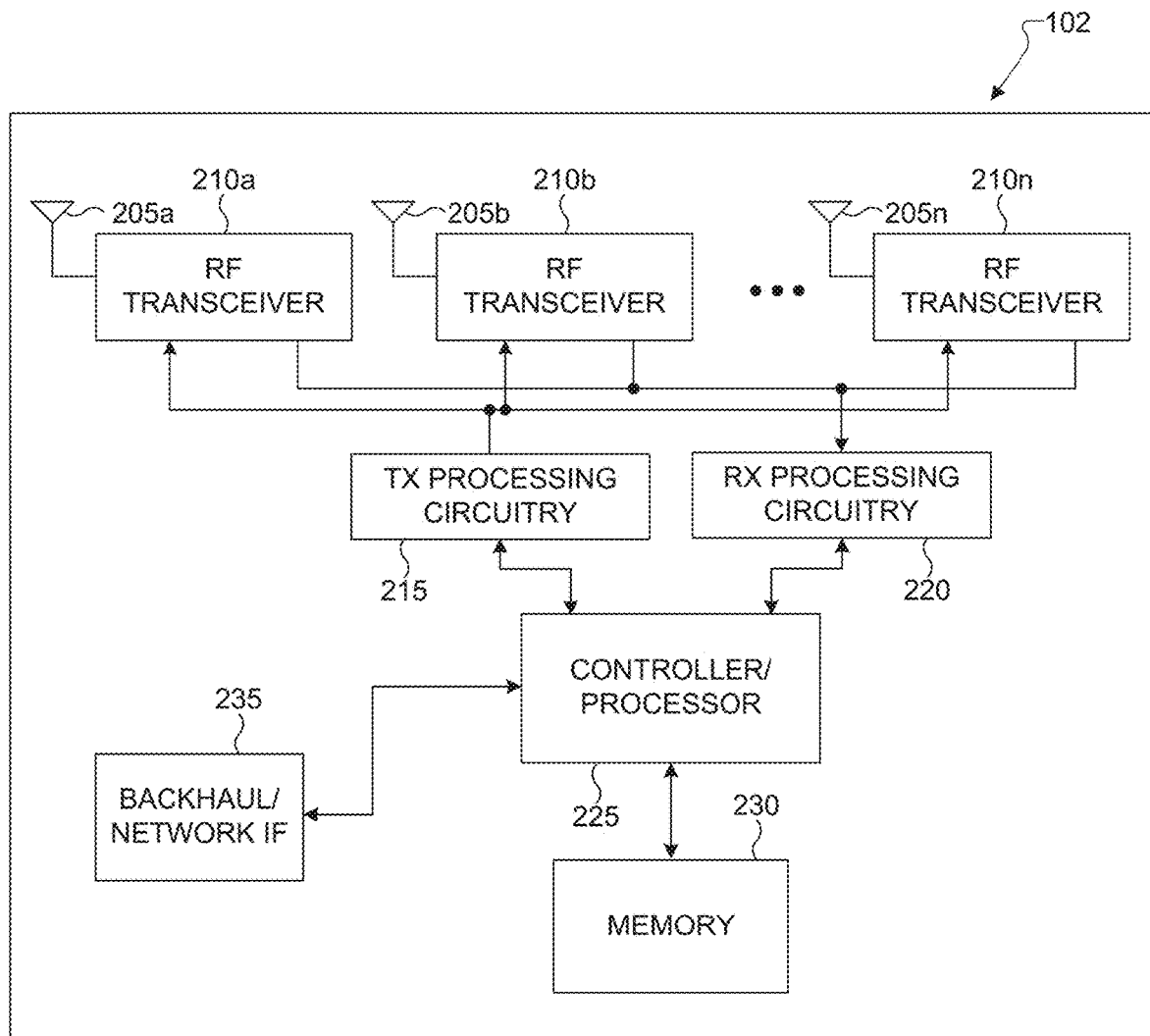
FIG. 2 illustrates an example gNB according to embodiments of the present disclosure.
Figure 3:
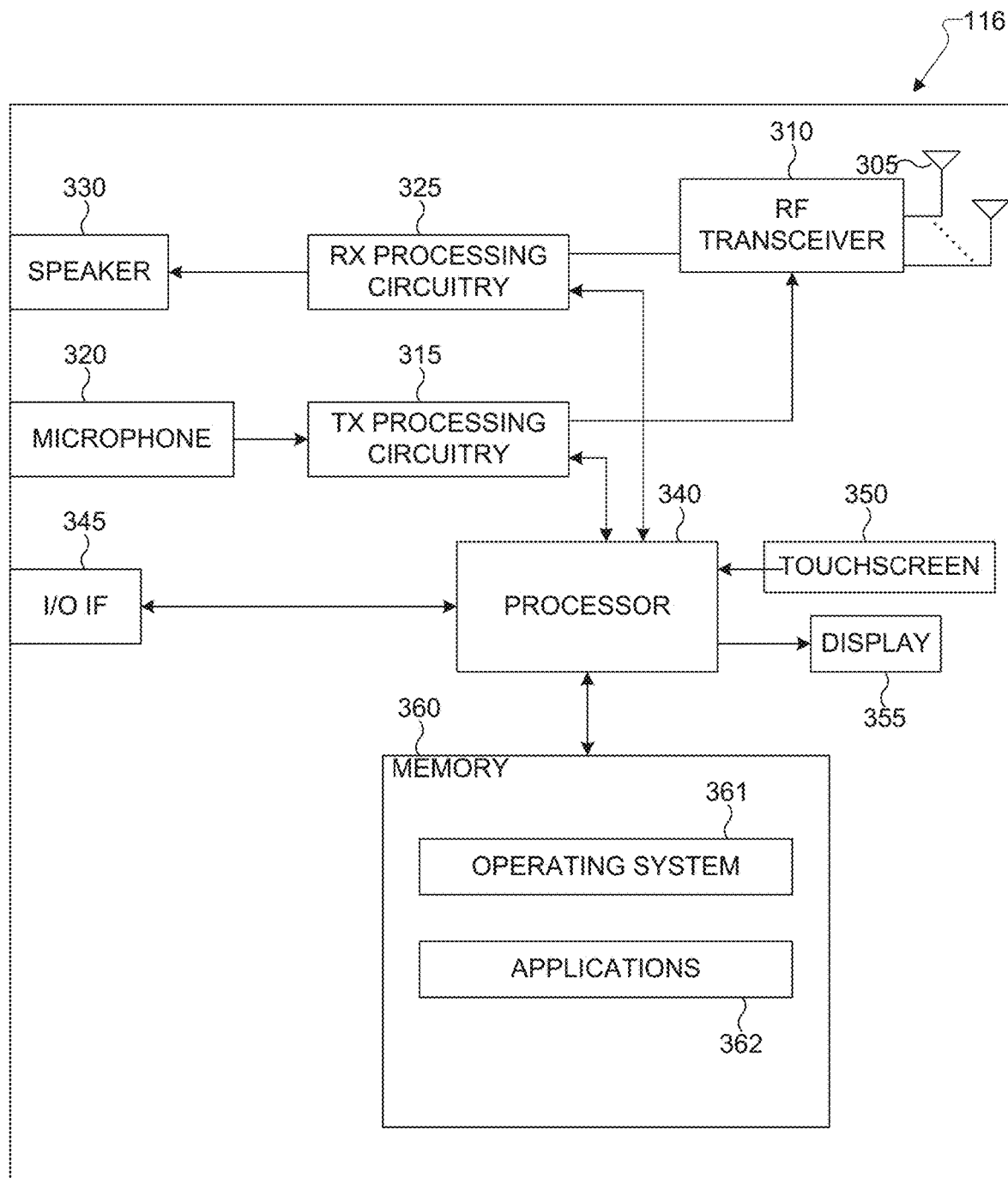
FIG. 3 illustrates an example UE according to embodiments of the present disclosure.

FIGS. 1-4B below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably-arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of this disclosure.

As shown in FIG. 1, the wireless network includes an gNB 101, an gNB 102, and an gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of UEs within a coverage area 120 of the gNB 102. The first plurality of UEs includes a UE 111, which may be located in a small business (SB); a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G, LTE, LTE-A, WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G base station (e.g., such as a general node B, i.e., gNB), a macrocell, a femtocell, a WiFi access point (AP), or other wirelessly enabled devices. Base stations may provide wireless access in accordance with one or more wireless communication protocols, e.g., 5G 3GPP new radio interface/access (NR), long term evolution (LTE), LTE advanced (LTE-A), high speed packet access (HSPA), Wi-Fi 802.11a/b/g/n/ac, etc. For the sake of convenience, the terms "BS," "TRP," and "gNB" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-116 include circuitry, programing, or a combination thereof, for efficient terminal-specific beamforming adaptation for advanced wireless systems. In certain embodiments, and one or more of the gNBs 101-103 includes circuitry, programing, or a combination thereof, for efficient terminal-specific beamforming adaptation for advanced wireless systems.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of this disclosure to any particular implementation of an gNB.

As shown in FIG. 2, the gNB 102 includes multiple antennas 205a-205n, multiple RF transceivers 210a-210n, transmit (TX) processing circuitry 215, and receive (RX) processing circuitry 220. The gNB 102 also includes a controller/processor 225, a memory 230, and a backhaul or network interface 235.

The RF transceivers 210a-210n receive, from the antennas 205a-205n, incoming RF signals, such as signals transmitted by UEs in the network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the gNB 102. For example, the controller/processor 225 could control the reception of forward channel signals and the transmission of reverse channel signals by the RF transceivers 210a-210n, the RX processing circuitry 220, and the TX processing circuitry 215 in accordance with well-known principles. The controller/processor 225 could support additional functions as well, such as more advanced wireless communication functions. For instance, the controller/processor 225 could support beam forming or directional routing operations in which outgoing signals from multiple antennas 205a-205n are weighted differently to effectively steer the outgoing signals in a desired direction. Any of a wide variety of other functions could be supported in the gNB 102 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM.

Although FIG. 2 illustrates one example of gNB 102, various changes may be made to FIG. 2. For example, the gNB 102 could include any number of each component shown in FIG. 2. As a particular example, an access point could include a number of interfaces 235, and the controller/processor 225 could support routing functions to route data between different network addresses. As another particular example, while shown as including a single instance of TX processing circuitry 215 and a single instance of RX processing circuitry 220, the gNB 102 could include multiple instances of each (such as one per RF transceiver). Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes an antenna 305, a radio frequency (RF) transceiver 310, TX processing circuitry 315, a microphone 320, and receive (RX) processing circuitry 325. The UE 116 also includes a speaker 330, a processor 340, an input/output (I/O) interface (IF) 345, a touchscreen 350, a display 355, and a memory 360. The memory 360 includes an operating system (OS) 361 and one or more applications 362.

The RF transceiver 310 receives, from the antenna 305, an incoming RF signal transmitted by an gNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of forward channel signals and the transmission of reverse channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for CSI reporting on PUCCH. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the touchscreen 350 and the display 355. The operator of the UE 116 can use the touchscreen 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

Figure 4A:
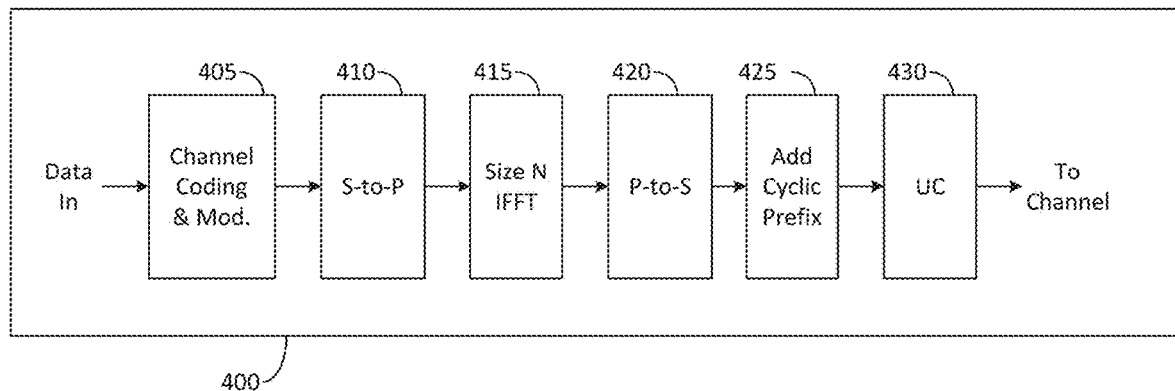
FIG. 4A illustrates a high-level diagram of an orthogonal frequency division multiple access transmit path according to embodiments of the present disclosure.
Figure 4B:
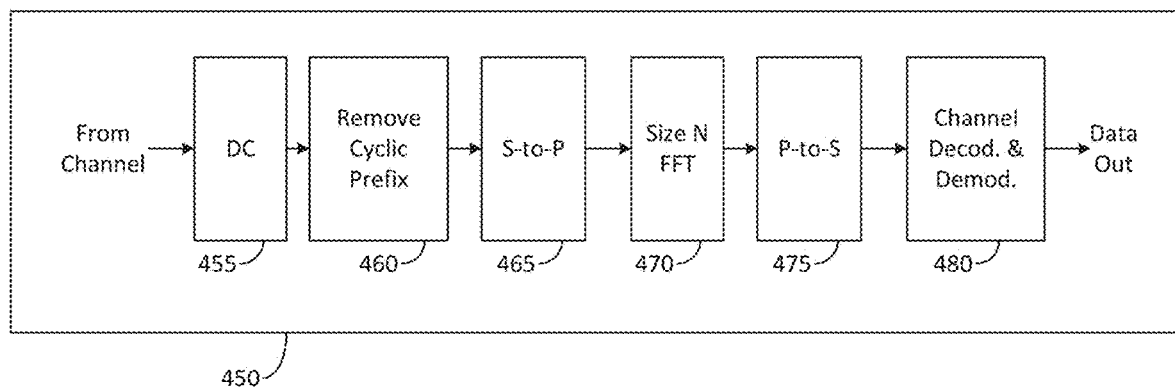
FIG. 4B illustrates a high-level diagram of an orthogonal frequency division multiple access receive path according to embodiments of the present disclosure.

FIG. 4A is a high-level diagram of transmit path circuitry. For example, the transmit path circuitry may be used for an orthogonal frequency division multiple access (OFDMA) communication. FIG. 4B is a high-level diagram of receive path circuitry. For example, the receive path circuitry may be used for an orthogonal frequency division multiple access (OFDMA) communication. In FIGS. 4A and 4B, for downlink communication, the transmit path circuitry may be implemented in a base station (gNB) 102 or a relay station, and the receive path circuitry may be implemented in a user equipment (e.g. user equipment 116 of FIG. 1). In other examples, for uplink communication, the receive path circuitry 450 may be implemented in a base station (e.g. gNB 102 of FIG. 1) or a relay station, and the transmit path circuitry may be implemented in a user equipment (e.g. user equipment 116 of FIG. 1).

Transmit path circuitry comprises channel coding and modulation block 405, serial-to-parallel (S-to-P) block 410, Size N Inverse Fast Fourier Transform (IFFT) block 415, parallel-to-serial (P-to-S) block 420, add cyclic prefix block 425, and up-converter (UC) 430. Receive path circuitry 450 comprises down-converter (DC) 455, remove cyclic prefix block 460, serial-to-parallel (S-to-P) block 465, Size N Fast Fourier Transform (FFT) block 470, parallel-to-serial (P-to-S) block 475, and channel decoding and demodulation block 480.

At least some of the components in FIGS. 4A 400 and 4B 450 may be implemented in software, while other components may be implemented by configurable hardware or a mixture of software and configurable hardware. In particular, it is noted that the FFT blocks and the IFFT blocks described in this disclosure document may be implemented as configurable software algorithms, where the value of Size N may be modified according to the implementation.

Furthermore, although this disclosure is directed to an embodiment that implements the Fast Fourier Transform and the Inverse Fast Fourier Transform, this is by way of illustration only and may not be construed to limit the scope of the disclosure. It may be appreciated that in an alternate embodiment of the present disclosure, the Fast Fourier Transform functions and the Inverse Fast Fourier Transform functions may easily be replaced by discrete Fourier transform (DFT) functions and inverse discrete Fourier transform (IDFT) functions, respectively. It may be appreciated that for DFT and IDFT functions, the value of the N variable may be any integer number (i.e., 1, 4, 3, 4, etc.), while for FFT and IFFT functions, the value of the N variable may be any integer number that is a power of two (i.e., 1, 2, 4, 8, 16, etc.).

In transmit path circuitry 400, channel coding and modulation block 405 receives a set of information bits, applies coding (e.g., LDPC coding) and modulates (e.g., quadrature phase shift keying (QPSK) or quadrature amplitude modulation (QAM)) the input bits to produce a sequence of frequency-domain modulation symbols. Serial-to-parallel block 410 converts (i.e., de-multiplexes) the serial modulated symbols to parallel data to produce N parallel symbol streams where N is the IFFT/FFT size used in BS 102 and UE 116. Size N IFFT block 415 then performs an IFFT operation on the N parallel symbol streams to produce time-domain output signals. Parallel-to-serial block 420 converts (i.e., multiplexes) the parallel time-domain output symbols from Size N IFFT block 415 to produce a serial time-domain signal. Add cyclic prefix block 425 then inserts a cyclic prefix to the time-domain signal. Finally, up-converter 430 modulates (i.e., up-converts) the output of add cyclic prefix block 425 to RF frequency for transmission via a wireless channel. The signal may also be filtered at baseband before conversion to RF frequency.

The transmitted RF signal arrives at UE 116 after passing through the wireless channel, and reverse operations to those at gNB 102 are performed. Down-converter 455 down-converts the received signal to baseband frequency, and remove cyclic prefix block 460 removes the cyclic prefix to produce the serial time-domain baseband signal. Serial-to-parallel block 465 converts the time-domain baseband signal to parallel time-domain signals. Size N FFT block 470 then performs an FFT algorithm to produce N parallel frequency-domain signals. Parallel-to-serial block 475 converts the parallel frequency-domain signals to a sequence of modulated data symbols. Channel decoding and demodulation block 480 demodulates and then decodes the modulated symbols to recover the original input data stream.

Each of gNBs 101-103 may implement a transmit path that is analogous to transmitting in the downlink to user equipment 111-116 and may implement a receive path that is analogous to receiving in the uplink from user equipment 111-116. Similarly, each one of user equipment 111-116 may implement a transmit path corresponding to the architecture for transmitting in the uplink to gNBs 101-103 and may implement a receive path corresponding to the architecture for receiving in the downlink from gNBs 101-103.

5G communication system use cases have been identified and described. Those use cases can be roughly categorized into three different groups. In one example, enhanced mobile broadband (eMBB) is determined to do with high bits/sec requirement, with less stringent latency and reliability requirements. In another example, ultra reliable and low latency (URLL) is determined with less stringent bits/sec requirement. In yet another example, massive machine type communication (mMTC) is determined that a number of devices can be as many as 100,000 to 1 million per km2, but the reliability/throughput/latency requirement could be less stringent. This scenario may also involve power efficiency requirement as well, in that the battery consumption should be minimized as possible.

A communication system includes a downlink (DL) that conveys signals from transmission points such as base stations (BSs) or NodeBs to user equipments (UEs) and an Uplink (UL) that conveys signals from UEs to reception points such as NodeBs. A UE, also commonly referred to as a terminal or a mobile station, may be fixed or mobile and may be a cellular phone, a personal computer device, or an automated device. An eNodeB, which is generally a fixed station, may also be referred to as an access point or other equivalent terminology. For LTE systems, a NodeB is often referred as an eNodeB.

In a communication system, such as LTE system, DL signals can include data signals conveying information content, control signals conveying DL control information (DCI), and reference signals (RS) that are also known as pilot signals. An eNodeB transmits data information through a physical DL shared channel (PDSCH). An eNodeB transmits DCI through a physical DL control channel (PDCCH) or an Enhanced PDCCH (EPDCCH).

An eNodeB transmits acknowledgement information in response to data transport block (TB) transmission from a UE in a physical hybrid ARQ indicator channel (PHICH). An eNodeB transmits one or more of multiple types of RS including a UE-common RS (CRS), channel state information RS (CSI-RS), or a demodulation RS (DMRS). A CRS is transmitted over a DL system bandwidth (BW) and can be used by UEs to obtain a channel estimate to demodulate data or control information or to perform measurements. To reduce CRS overhead, an eNodeB may transmit a CSI-RS with a smaller density in the time and/or frequency domain than a CRS. DMRS can be transmitted only in the BW of a respective PDSCH or EPDCCH and a UE can use the DMRS to demodulate data or control information in a PDSCH or an EPDCCH, respectively. A transmission time interval for DL channels is referred to as a subframe and can have, for example, duration of 1 millisecond.

DL signals also include transmission of a logical channel that carries system control information. A BCCH is mapped to either a transport channel referred to as a broadcast channel (BCH) when the BCCH conveys a master information block (MIB) or to a DL shared channel (DL-SCH) when the BCCH conveys a system information block (SIB). Most system information is included in different SIBs that are transmitted using DL-SCH. A presence of system information on a DL-SCH in a subframe can be indicated by a transmission of a corresponding PDCCH conveying a codeword with a cyclic redundancy check (CRC) scrambled with special system information RNTI (SI-RNTI). Alternatively, scheduling information for a SIB transmission can be provided in an earlier SIB and scheduling information for the first SIB (SIB-1) can be provided by the MIB.

DL resource allocation is performed in a unit of subframe and a group of physical resource blocks (PRBs). A transmission BW includes frequency resource units referred to as resource blocks (RBs). Each RB includes $N_{sc}^{RB}$ sub-carriers, or resource elements (REs), such as 12 REs. A unit of one RB over one subframe is referred to as a PRB. A UE can be allocated $M_{PDSCH}$ RBs for a total of $M_{sc}^{PDSCH} = M_{PDSCH} \cdot N_{sc}^{RB}$ REs for the PDSCH transmission BW.

UL signals can include data signals conveying data information, control signals conveying UL control information (UCI), and UL RS. UL RS includes DMRS and Sounding RS (SRS). A UE transmits DMRS only in a BW of a respective PUSCH or PUCCH. An eNodeB can use a DMRS to demodulate data signals or UCI signals. A UE transmits SRS to provide an eNodeB with an UL CSI. A UE transmits data information or UCI through a respective physical UL shared channel (PUSCH) or a Physical UL control channel (PUCCH). If a UE needs to transmit data information and UCI in a same UL subframe, the UE may multiplex both in a PUSCH. UCI includes Hybrid Automatic Repeat request acknowledgement (HARQ-ACK) information, indicating correct (ACK) or incorrect (NACK) detection for a data TB in a PDSCH or absence of a PDCCH detection (DTX), scheduling request (SR) indicating whether a UE has data in the UE's buffer, rank indicator (RI), and channel state information (CSI) enabling an eNodeB to perform link adaptation for PDSCH transmissions to a UE. HARQ-ACK information is also transmitted by a UE in response to a detection of a PDCCH/EPDCCH indicating a release of semi-persistently scheduled PDSCH.

An UL subframe includes two slots. Each slot includes $N_{symb}^{UL}$ symbols for transmitting data information, UCI, DMRS, or SRS. A frequency resource unit of an UL system BW is a RB. A UE is allocated $N_{RB}$ RBs for a total of $N_{RB} \cdot N_{sc}^{RB}$ REs for a transmission BW. For a PUCCH, $N_{RB}=1$. A last subframe symbol can be used to multiplex SRS transmissions from one or more UEs. A number of subframe symbols that are available for data/UCI/DMRS transmission is $N_{symb}=2 \cdot (N_{symb}^{UL}-1)-N_{SRS}$, where $N_{SRS}=1$ if a last subframe symbol is used to transmit SRS and $N_{SRS}=0$ otherwise.

Figure 5:
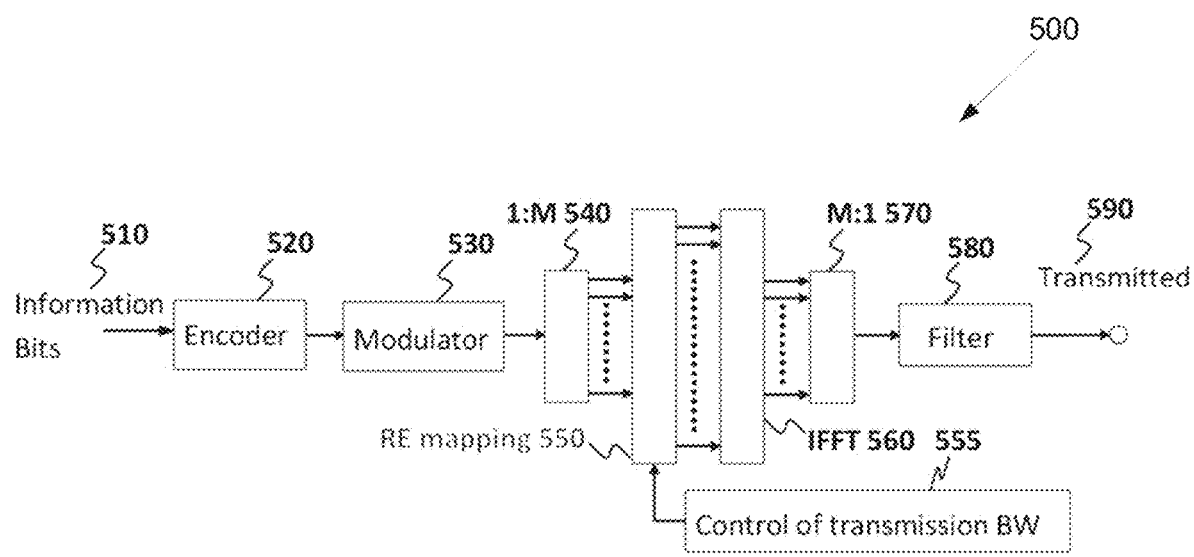
FIG. 5 illustrates a transmitter block diagram for a PDSCH in a subframe according to embodiments of the present disclosure.

FIG. 5 illustrates a transmitter block diagram 500 for a PDSCH in a subframe according to embodiments of the present disclosure. The embodiment of the transmitter block diagram 500 illustrated in FIG. 5 is for illustration only. FIG. 5 does not limit the scope of this disclosure to any particular implementation of the transmitter block diagram 500.

As shown in FIG. 5, information bits 510 are encoded by encoder 520, such as a turbo encoder, and modulated by modulator 530, for example using quadrature phase shift keying (QPSK) modulation. A serial to parallel (S/P) converter 540 generates M modulation symbols that are subsequently provided to a mapper 550 to be mapped to REs selected by a transmission BW selection unit 555 for an assigned PDSCH transmission BW, unit 560 applies an Inverse fast Fourier transform (IFFT), the output is then serialized by a parallel to serial (P/S) converter 570 to create a time domain signal, filtering is applied by filter 580, and a signal transmitted 590. Additional functionalities, such as data scrambling, cyclic prefix insertion, time windowing, interleaving, and others are well known in the art and are not shown for brevity.

Figure 6:
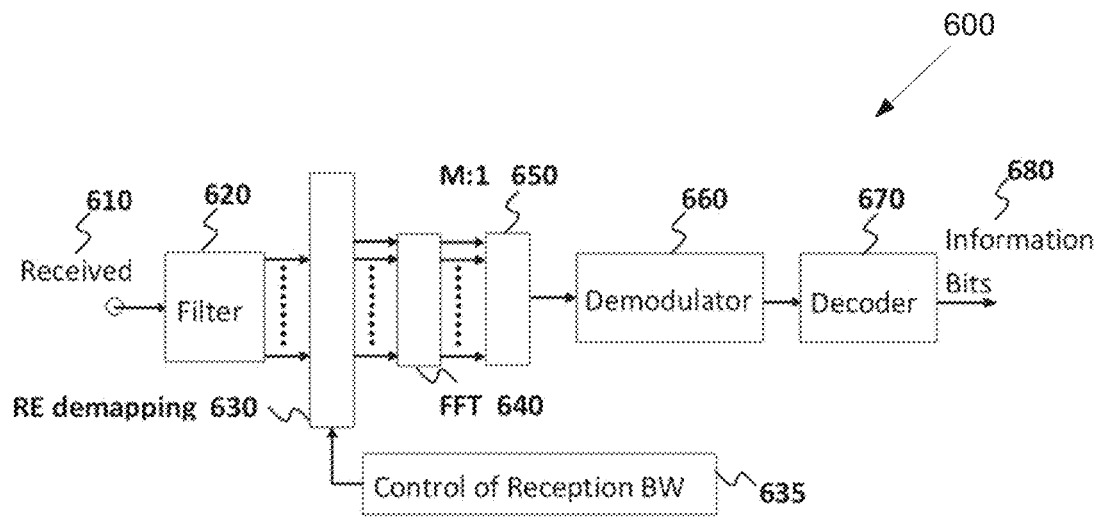
FIG. 6 illustrates a receiver block diagram for a PDSCH in a subframe according to embodiments of the present disclosure.

FIG. 6 illustrates a receiver block diagram 600 for a PDSCH in a subframe according to embodiments of the present disclosure. The embodiment of the diagram 600 illustrated in FIG. 6 is for illustration only. FIG. 6 does not limit the scope of this disclosure to any particular implementation of the diagram 600.

As shown in FIG. 6, a received signal 610 is filtered by filter 620, REs 630 for an assigned reception BW are selected by BW selector 635, unit 640 applies a fast Fourier transform (FFT), and an output is serialized by a parallel-to-serial converter 650. Subsequently, a demodulator 660 coherently demodulates data symbols by applying a channel estimate obtained from a DMRS or a CRS (not shown), and a decoder 670, such as a turbo decoder, decodes the demodulated data to provide an estimate of the information data bits 680. Additional functionalities such as time-windowing, cyclic prefix removal, de-scrambling, channel estimation, and de-interleaving are not shown for brevity.

Figure 7:
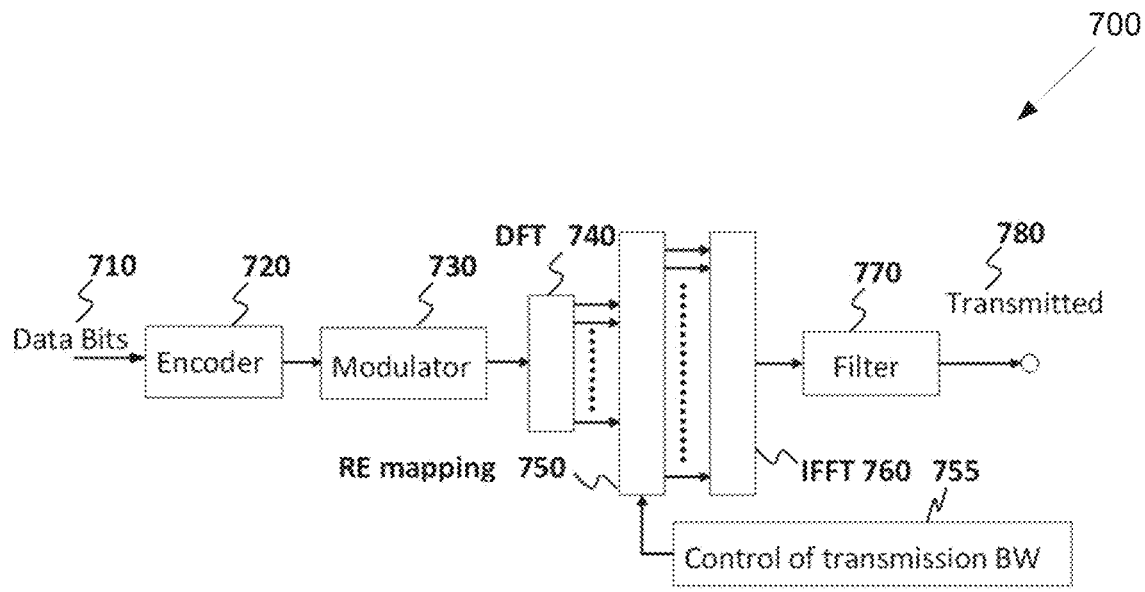
FIG. 7 illustrates a transmitter block diagram for a PUSCH in a subframe according to embodiments of the present disclosure.

FIG. 7 illustrates a transmitter block diagram 700 for a PUSCH in a subframe according to embodiments of the present disclosure. The embodiment of the block diagram 700 illustrated in FIG. 7 is for illustration only. FIG. 7 does not limit the scope of this disclosure to any particular implementation of the block diagram 700.

As shown in FIG. 7, information data bits 710 are encoded by encoder 720, such as a turbo encoder, and modulated by modulator 730. A discrete Fourier transform (DFT) unit 740 applies a DFT on the modulated data bits, REs 750 corresponding to an assigned PUSCH transmission BW are selected by transmission BW selection unit 755, unit 760 applies an IFFT and, after a cyclic prefix insertion (not shown), filtering is applied by filter 770 and a signal transmitted 780.

Figure 8:
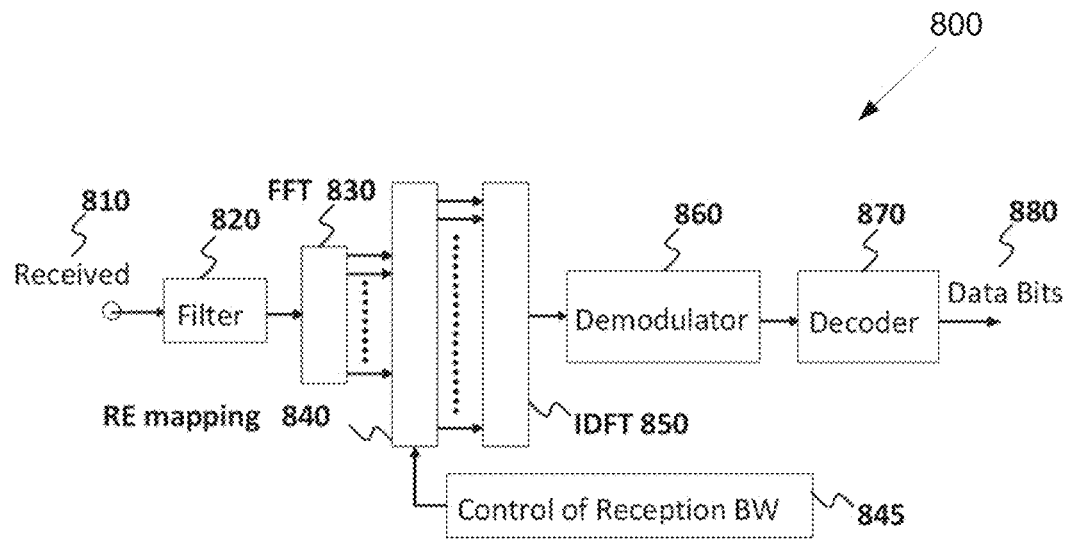
FIG. 8 illustrates a receiver block diagram for a PUSCH in a subframe according to embodiments of the present disclosure.

FIG. 8 illustrates a receiver block diagram 800 for a PUSCH in a subframe according to embodiments of the present disclosure. The embodiment of the block diagram 800 illustrated in FIG. 8 is for illustration only. FIG. 8 does not limit the scope of this disclosure to any particular implementation of the block diagram 800.

As shown in FIG. 8, a received signal 810 is filtered by filter 820. Subsequently, after a cyclic prefix is removed (not shown), unit 830 applies a FFT, REs 840 corresponding to an assigned PUSCH reception BW are selected by a reception BW selector 845, unit 850 applies an inverse DFT (IDFT), a demodulator 860 coherently demodulates data symbols by applying a channel estimate obtained from a DMRS (not shown), a decoder 870, such as a turbo decoder, decodes the demodulated data to provide an estimate of the information data bits 880.

In next generation cellular systems, various use cases are envisioned beyond the capabilities of LTE system. Termed 5G or the fifth generation cellular system, a system capable of operating at sub-6 GHz and above-6 GHz (for example, in mmWave regime) becomes one of the requirements. In 3GPP TR 22.891, 74 5G use cases has been identified and described; those use cases can be roughly categorized into three different groups. A first group is termed 'enhanced mobile broadband' (eMBB), targeted to high data rate services with less stringent latency and reliability requirements. A second group is termed "ultra-reliable and low latency (URLL)" targeted for applications with less stringent data rate requirements, but less tolerant to latency. A third group is termed "massive MTC (mMTC)" targeted for large number of low-power device connections such as 1 million per $km^2$ with less stringent the reliability, data rate, and latency requirements.

In order for the 5G network to support such diverse services with different quality of services (QoS), one embodiment has been identified in LTE specification, called network slicing. To utilize PHY resources efficiently and multiplex various slices (with different resource allocation schemes, numerologies, and scheduling strategies) in DL-SCH, a flexible and self-contained frame or subframe design is utilized.

Figure 9:
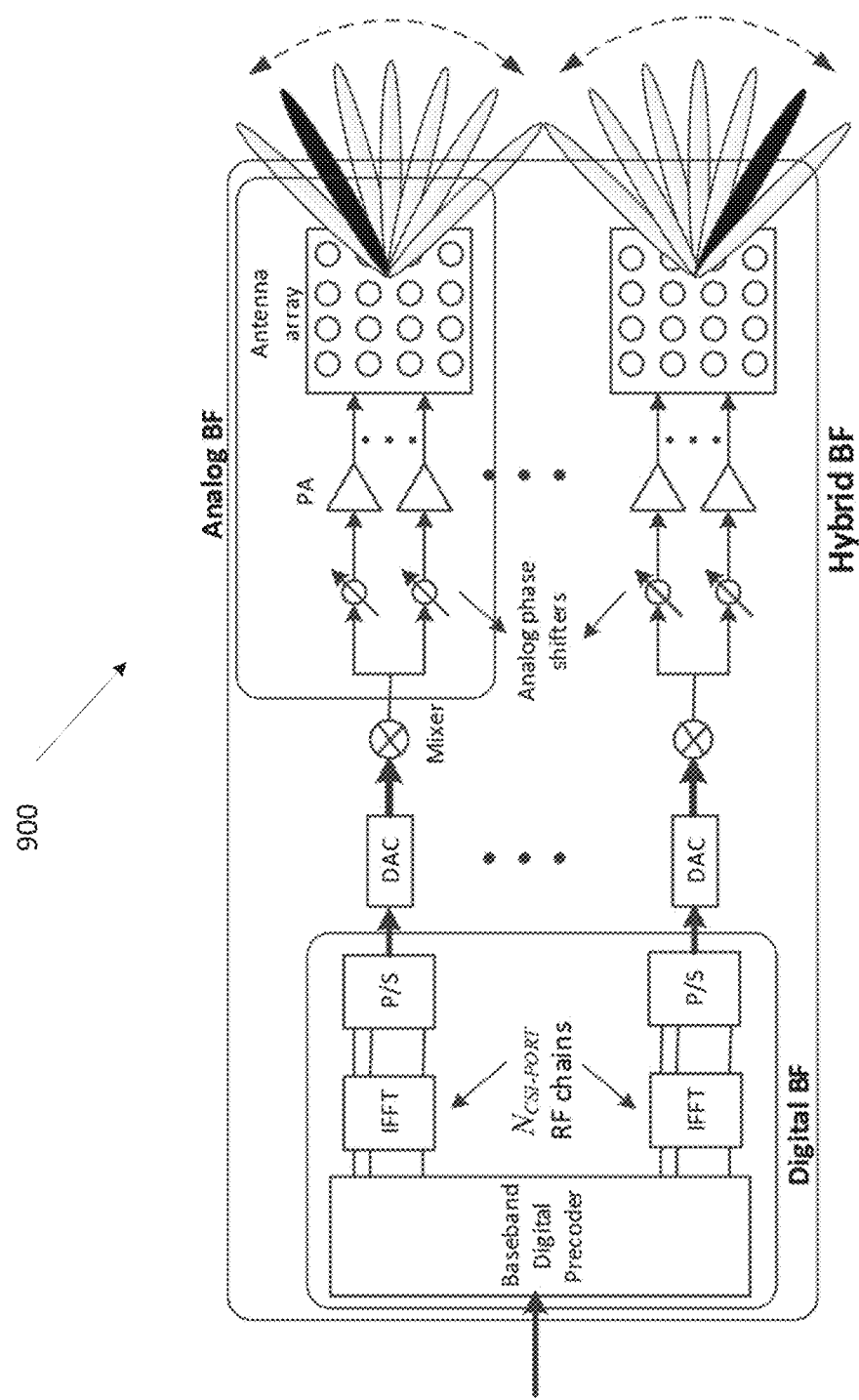
FIG. 9 illustrates an example multiplexing of two slices according to embodiments of the present disclosure.

FIG. 9 illustrates an example antenna blocks 900 according to embodiments of the present disclosure. The embodiment of the antenna blocks 900 illustrated in FIG. 9 is for illustration only. FIG. 9 does not limit the scope of this disclosure to any particular implementation of the antenna blocks 900.

Figure 10:
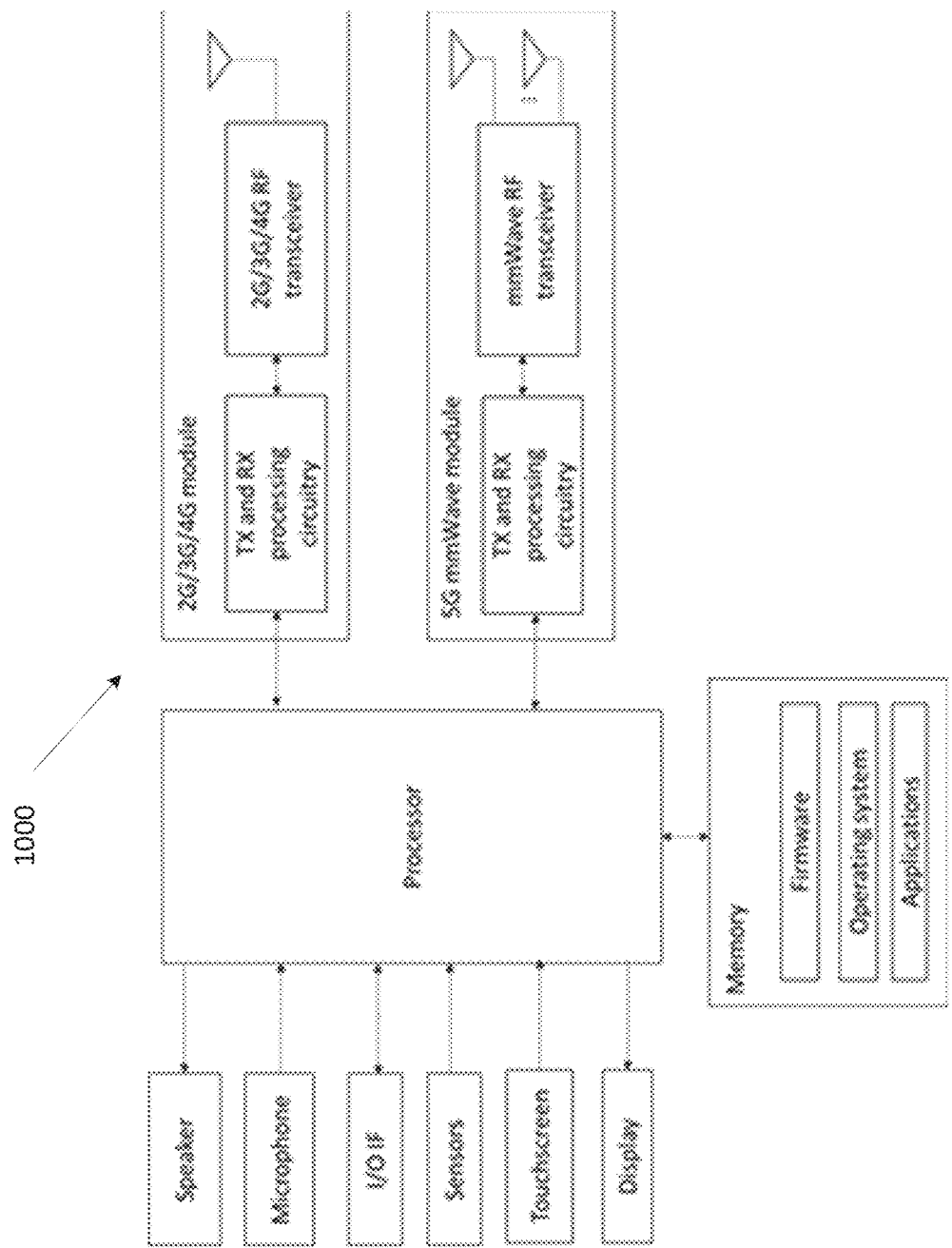
FIG. 10 illustrates an example user equipment according to embodiments of the present disclosure.

For mmWave bands, although the number of antenna elements can be larger for a given form factor, the number of CSI-RS ports—which can correspond to the number of digitally precoded ports—tends to be limited due to hardware constraints (such as the feasibility to install a large number of ADCs/DACs at mmWave frequencies) as illustrated in FIG. 10. In this case, one CSI-RS port is mapped onto a large number of antenna elements which can be controlled by a bank of analog phase shifters. One CSI-RS port can then correspond to one sub-array which produces a narrow analog beam through analog beamforming. This analog beam can be configured to sweep across a wider range of angles by varying the phase shifter bank across symbols or subframes. The number of sub-arrays (equal to the number of RF chains) is the same as the number of CSI-RS ports $N_{CSI-PORT}$. A digital beamforming unit performs a linear combination across $N_{CSI-PORT}$ analog beams to further increase precoding gain. While analog beams are wideband (hence not frequency-selective), digital precoding can be varied across frequency sub-bands or resource blocks.

In LTE, a number of CSI reporting modes exist for both periodic (PUCCH-based) and aperiodic (PUSCH-based) CSI reporting. Each CSI reporting mode is depend on (coupled with) many other parameters (e.g. codebook selection, transmission mode, eMIMO-Type, RS type, number of CRS or CSI-RS ports). At least two drawbacks can be perceived. First, complex "nested loops" (IF . . . ELSE . . . ) and webs of couplings/linkages exist. This complicates testing efforts. Second, forward compatibility is limited especially when new features are introduced.

While the above drawbacks apply to DL CSI measurement, the same can be said for UL CSI measurements. In LTE, UL CSI measurement framework exists in a primitive form and is not as evolved as DL counterpart. In the advent of TDD or reciprocity-based systems for next generation systems along with the likely prominence of OFDMA or OFDMA-based multiple access for UL, a same (or at least similar) CSI measurement and reporting framework applicable for both DL and UL is beneficial.

To assist the UE in determining RX and/or TX beam of the UE, a beam sweeping procedure is employed consisting of the gNB transmitting a set of transmit beams to sweep the cell area and the UE measuring the signal quality on different beams using the UE's receive beams. To facilitate candidate beam identification, beam measurement and beam quality reporting, the gNB configures the UE with one or more RS resource (e.g. SS Block, Periodic/Aperiodic/Semi-Persistent CSI-RS resources or CRIs) corresponding to a set of TX beams. An RS resource refers to a reference signal transmission on a combination of one or more time (OFDM symbol)/frequency (resource element)/spatial (antenna port) domain locations. For each RX beam, the UE reports different TX beams received using that RX beam, ranked in order of signal strength (RSRP) and optionally CSI (CQI/PMI/RI)). Based on the UE's measurement report feedback, the gNB configures the UE with a set of TX-RX beam pairs for reception of PDCCH and/or PDSCH.

FIG. 10 illustrates an example user equipment 1000 according to embodiments of the present disclosure. The embodiment of the user equipment 1000 illustrated in FIG. 10 is for illustration only. FIG. 10 does not limit the scope of this disclosure to any particular implementation.

As shown in FIG. 10, the UE includes a 2G/3G/4G communication module and a 5G mmWave communication module. Each communication module includes one or more antennas, one radio frequency (RF) transceiver, transmit (TX) and receive (RX) processing circuitry. The UE also includes a speaker, a processor, an input/output (I/O) interface (IF), one or more sensors (touch sensor(s), proximity sensor(s), gyroscope, etc.), a touchscreen, a display, and a memory. The memory includes, a firmware, an operating system (OS) and one or more applications.

The RF transceiver receives, from the antenna, an incoming RF signal transmitted by an eNB/gNB of the network. The RF transceiver down-converts the incoming RF signal to generate an intermediate frequency (IF) or baseband signal. The IF or baseband signal is sent to the RX processing circuitry, which generates a processed baseband signal by filtering, decoding, and/or digitizing the baseband or IF signal. The RX processing circuitry transmits the processed baseband signal to the processor for further processing (such as for voice or web browsing data).

The TX processing circuitry receives outgoing baseband data (such as voice, web data, e-mail, or interactive video game data) from the processor. The TX processing circuitry encodes, multiplexes, and/or digitizes the outgoing baseband data to generate a processed baseband or IF signal. The RF transceiver receives the outgoing processed baseband or IF signal from the TX processing circuitry and up-converts the baseband or IF signal to an RF signal that is transmitted via the antenna The processor can include one or more processors and execute the basic OS program stored in the memory in order to control the overall operation of the UE. In one such operation, the main processor controls the reception of forward channel signals and the transmission of reverse channel signals by the RF transceiver, the RX processing circuitry, and the TX processing circuitry in accordance with well-known principles. The main processor can also include processing circuitry configured to allocate one or more resources.

For example, the processor can include allocator processing circuitry configured to allocate a unique carrier indicator and detector processing circuitry configured to detect a physical downlink control channel (PDCCH) scheduling a physical downlink shared channel (PDSCH) reception of a physical uplink shared channel (PUSCH) transmission in one of the carriers. downlink control information (DCI) serves several purposes and is conveyed through DCI formats in respective PDCCHs. For example, a DCI format may correspond to a downlink assignment for PDSCH receptions or to an uplink grant for PUSCH transmissions. In some embodiments, the processor includes at least one microprocessor or microcontroller.

The processor is also capable of executing other processes and programs resident in the memory, such as operations for inter-eNB/gNB coordination schemes to support inter-eNB/gNB carrier aggregation. It should be understood that inter-eNB/gNB carrier aggregation can also be referred to as dual connectivity. The processor can move data into or out of the memory as required by an executing process. In some embodiments, the processor is configured to execute a plurality of applications, such as applications for MU-MIMO communications, including obtaining control channel elements of PDCCHs.

The processor can operate the plurality of applications based on the OS program or in response to a signal received from an eNB/gNB. The main processor is also coupled to the I/O interface, which provides UE with the ability to connect to other devices such as laptop computers and handheld computers. The I/O interface is the communication path between these accessories and the main controller.

The processor is also coupled to the touchscreen and the display. The operator of the UE can use the touchscreen to enter data into the UE. The display may be a liquid crystal display, light emitting diode display, or other display capable of rendering text and/or at least limited graphics, such as from web sites.

The memory is coupled to the processor. Part of the memory could include a random access memory (RAM), and another part of the memory could include a Flash memory or other read-only memory (ROM).

Although FIG. 10 illustrates one example of UE, various changes may be made to FIG. 10. For example, various components in FIG. 10 could be combined, further subdivided, or omitted and additional components could be added according to particular needs. As a particular example, the processor could be divided into multiple processors, such as one or more central processing units (CPUs) and one or more graphics processing units (GPUs). Also, while FIG. 10 illustrates the UE configured as a mobile telephone or smartphone, UEs could be configured to operate as other types of mobile or stationary devices.

A 5G terminal or a UE can be equipped with multiple antenna elements. Beamforming is an important factor when the UE tries to establish a connection with a BS station. To compensate for the narrower analog beamwidth in mmWave, analog beams sweeping can be employed to enable wider signal reception or transmission coverage for the UE.

A beam codebook comprises a set of codewords, where a codeword may be a set of analog phase shift values, or a set of amplitude plus phase shift values, applied to the antenna elements, in order to form an analog beam. Give a set of beam codebook, the beams can be swept one by one, for example, from left to right in the horizontal domain, from top to down in the elevational domain.

There are several issues with this simple approach. First, not all the beams are equal in gain and shape. Some of the beams may have larger gain in a small sphere region while some other has lower gain but a wider beamwidth. For instance, the beams pointing to the boresight direction often have the highest gain but narrowest beamwidth while the beams pointing to an end fire region have the largest beamwidth and lowest gain. This observation should be taken into account when designing a beam sweeping procedure with minimized latency.

Second, wireless signal may come from certain direction(s) more often than the other directions. Therefore, the beams corresponding to directions with higher probability of occurrence may be selected with higher probability than others.

Third, the beam sweeping is time-consuming when the codebook size is large. The number of swept beams and/or stop beam sweeping is limited once a sufficiently good beam is found which is beneficial in delay-sensitive cases, for example, the vehicle-to-vehicle communication.

In one embodiment, a UE is equipped with a unit which determines the beam sweeping sequence for the UE based on one or more of the inputs, including: beam codebook or equivalently the beam patterns corresponding the beam codebook; target performance metric for beam sweeping; and a UE-specific condition, such as the UE orientation, and/or channel environment.

A 5G terminal or a UE can be equipped with multiple radio front-end (RF) modules where each module has an antenna array based on the architecture as illustrated in FIG. 10. Certain architecture may also allow an RF module to have more than one antenna array. Each RF module is capable of generating RF beams with phase shifters, or with phase shifters as well as amplitude weights.

In one embodiment, system optimization is considered as the design of cross-module and/or cross-layer procedure/algorithm to determine which RF beam(s) in which RF module of the UE to employ given a UE-specific condition. A UE-specific condition can include one or more of the following factors: the channel state experienced by the UE; the protocol state of the UE; the application state of the UE; and the physical state of the UE.

Channel state includes desired and interfering signal channel conditions as determined by the network deployment scenario, user's environment, hand or body or object blockages, and movement of the UE. Protocol state refers to the UE modem's connectivity status or activity. For example, the UE can be in state of initial access, or handover. It can be in the RRC connected state, RRC idle state or RRC inactive state. It can be in the state of receiving or transmitting broadcast or unicast signals or both. It can be in the state of receiving or transmitting control channel, data channel or both. A protocol state is considered as one or more of the aforementioned modem connectivity activities. Application state refers to the user's current application(s) (e.g. video, voice, hyper text transfer protocol (http)). The physical state includes the device orientation, the physical condition of the device that may impact the radio performance such as the casing of the device, faulty antenna or RF module due to damage.

Figure 11:
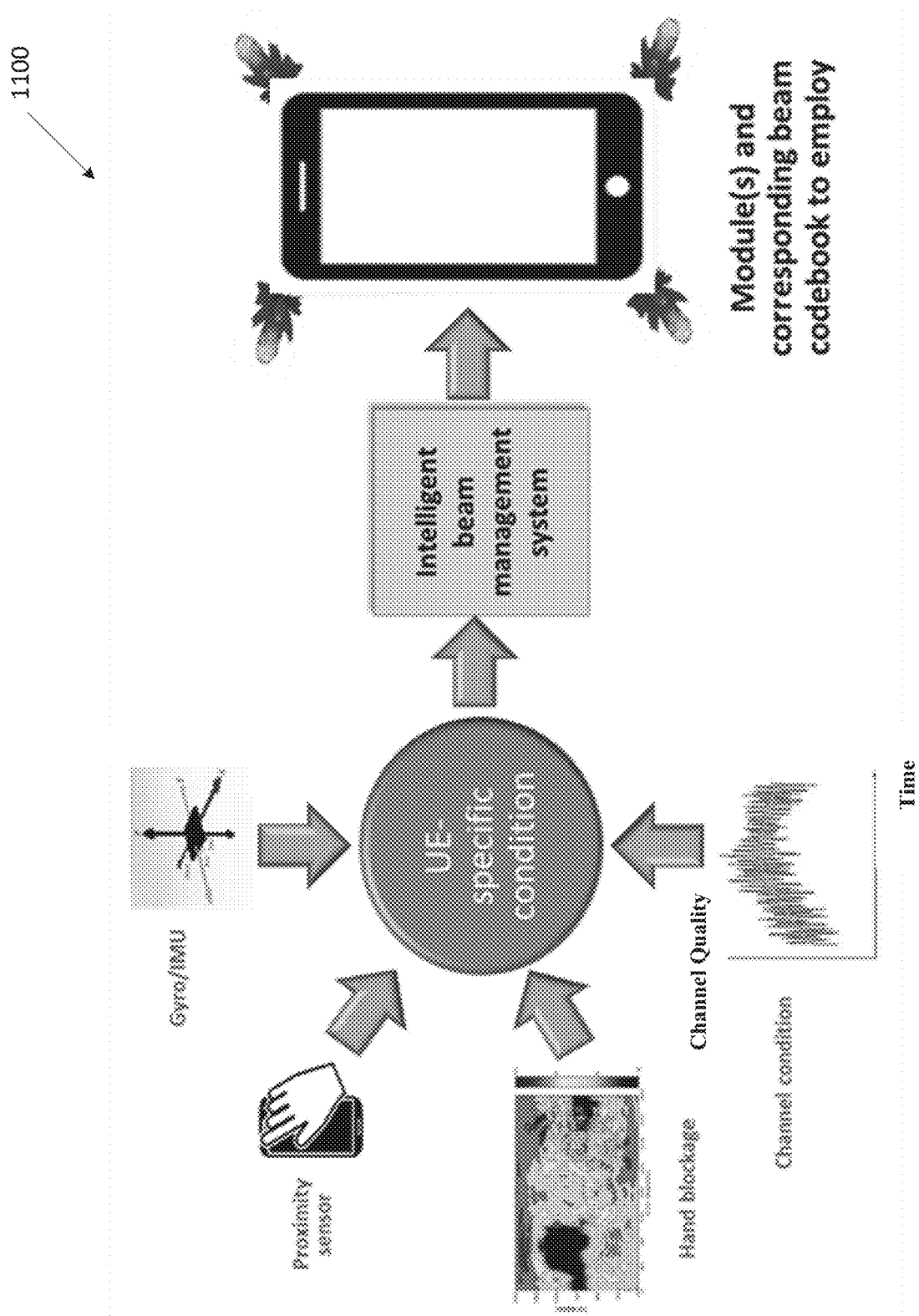
FIG. 11 illustrates an example system optimization according to embodiments of the present disclosure.

FIG. 11 illustrates an example system optimization 1100 according to embodiments of the present disclosure. The embodiment of the system optimization 1100 illustrated in FIG. 11 is for illustration only. FIG. 11 does not limit the scope of this disclosure to any particular implementation.

An overview of the system optimization is illustrated in FIG. 11. The UE-specific condition is determined based on inputs from sensors on the terminal such as gyroscope, an inertial measurement unit (IMU), a proximity sensor, a GPS receiver, a hand or body blockage detection and channel condition. The UE-specific condition is an input to an intelligent beam management system, which controls the RF module and the analog beams to employ.

Figure 12:
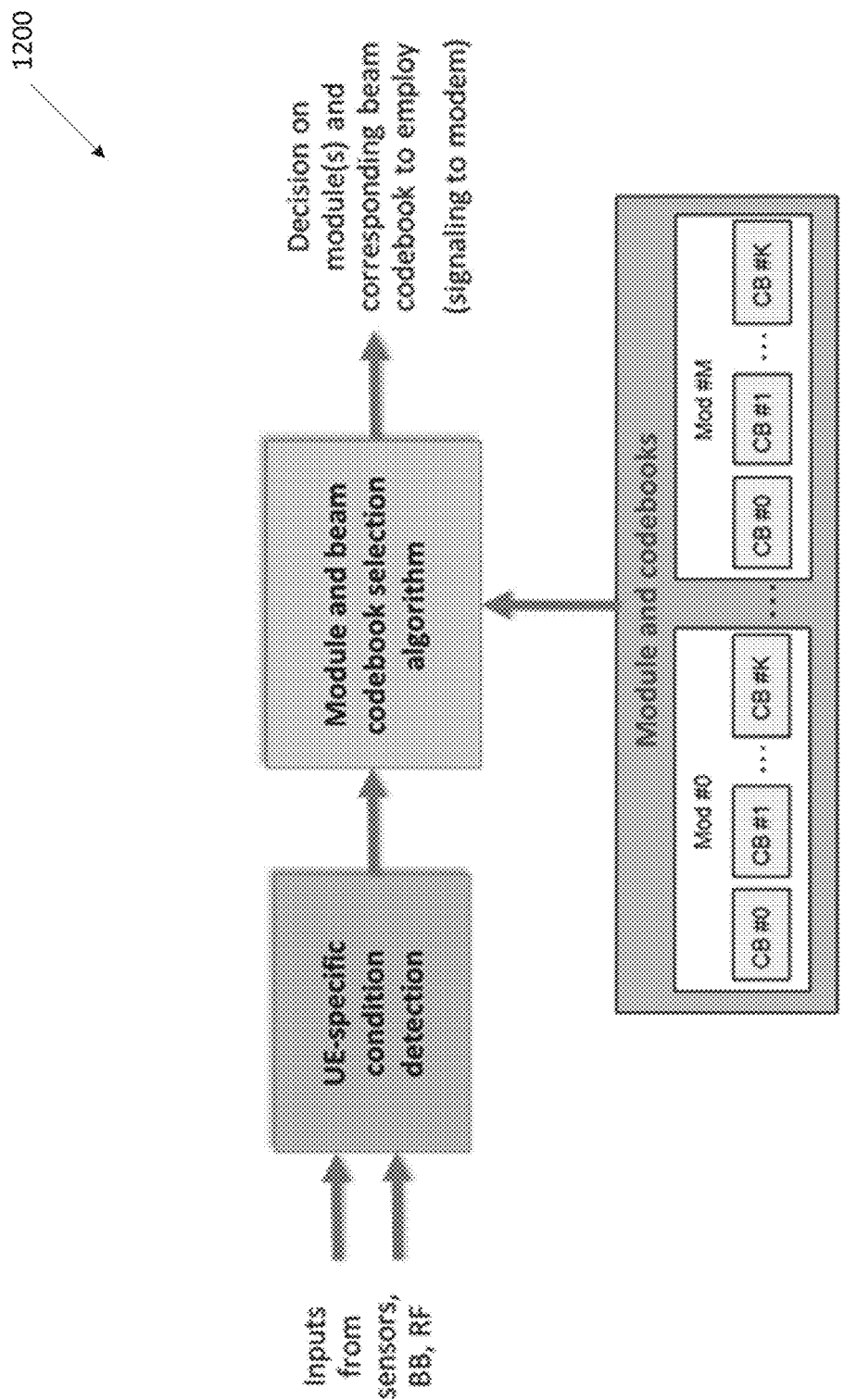
FIG. 12 illustrates an example system optimization framework according to embodiments of the present disclosure.

FIG. 12 illustrates an example system optimization framework 1200 according to embodiments of the present disclosure. The embodiment of the system optimization framework 1200 illustrated in FIG. 12 is for illustration only. FIG. 12 does not limit the scope of this disclosure to any particular implementation.

Further details on the system optimization framework are illustrated in FIG. 12. The framework includes 3 modules. The first module is the UE-specific condition detection module, which takes inputs such as measurements from the sensors, the 5G modem baseband (BB) and the RF modules. The UE-specific condition detection module outputs the UE-specific condition. The second module is the module which performs RF module and RF/analog beam codebook selection algorithm.

The third module is the codebook module which stores the RF/analog beam codebooks for the RF modules. The second module takes the UE-specific condition and the beam codebooks from the third module as inputs and outputs the decision on the RF module(s) and the corresponding beam codebook to employ. The outputs can be signaled to the 5G BB module or to the RF modules. In one example architecture, the second module and the third module are combined as one module.

In another example of architecture, the first, second, and the third modules are combined as one module. There can be multiple beam codebooks per module as shown in FIG. 12, or there can be only beam codebook per module, in which case the second module selects a subset of codewords (or beams) from the codebook for each module. For the remainder of the present disclosure, it is assumed that there is one codebook per module. However, it should be understood that the present disclosure can also be applied to the case of multiple codebooks per module. For this disclosure, beam and codeword are used interchangeably.

By default, the set of codewords used by the device can be the union of all codewords of codebooks from all modules on the device. This set of codewords can be designed given the antenna type, the antenna placement on the device and the housing of the antennas. This set of codewords or codebook is referred to as the default codebook. For example, assuming there are 16 codewords per module and two modules per device, there are 32 codewords per device. If only one codeword can be activated at any given time, a UE needs to perform beam sweeping over the 32 beams to determine the best beam to use for the UE. However, not all beams may be used with equal probability. If only a subset of the codewords is used with very high probability and since beam sweeping latency is directly proportional to the number of beams, it can be beneficial to create a sub-codebook comprising the set of codewords with high usage rate, such that the beam sweeping latency with the sub-codebook can be reduced.

Figure 13:
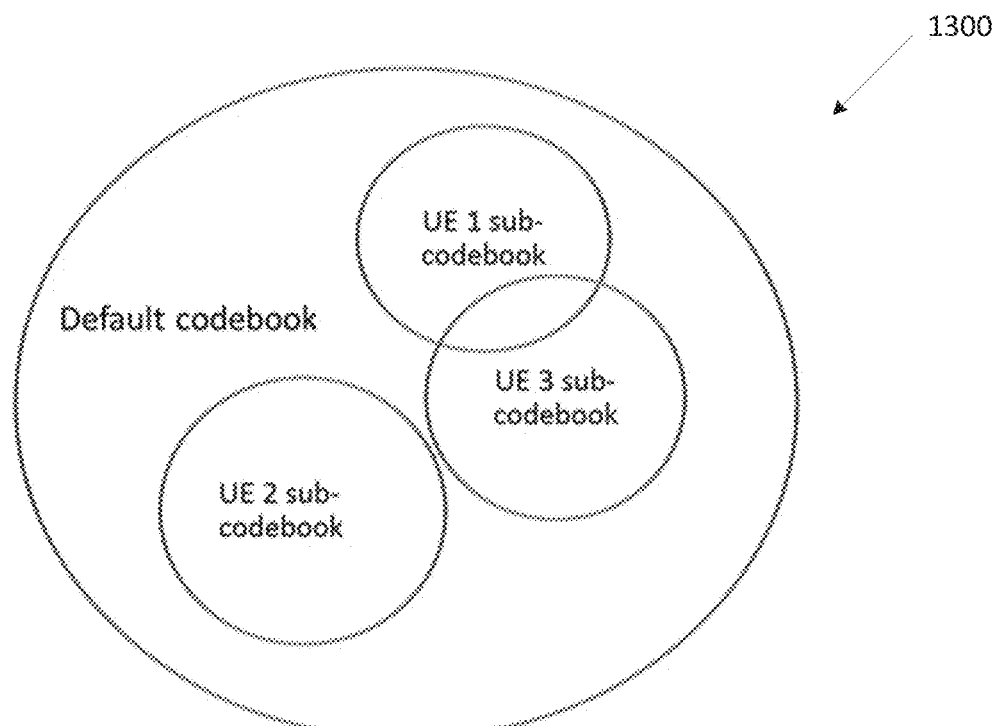
FIG. 13 illustrates an example UE-specific beam sub-codebook according to embodiments of the present disclosure.

FIG. 13 illustrates an example UE-specific beam sub-codebook 1300 according to embodiments of the present disclosure. The embodiment of the UE-specific beam sub-codebook 1300 illustrated in FIG. 13 is for illustration only. FIG. 13 does not limit the scope of this disclosure to any particular implementation.

Moreover, the UE-specific condition can change the usage rate of the codewords. This implies that the sub-codebook comprising the set of codewords with high usage rate can vary from a UE to a UE. Therefore, there is a need for a method to determine the UE-specific sub-codebook for the purpose of beam sweeping latency reduction. The concept of UE-specific sub-codebook can be illustrated with a Venn diagram as shown in FIG. 13, where three UE-specific sub-codebooks are shown. The sub-codebooks may or may not overlap.

In another example, there is a default sub-codebook which is a set of codewords designed given the antenna type, the antenna placement on the device, the housing of the antennas and a required sub-codebook size, out of consideration on the beam sweeping latency, and beam management overhead/complexity. The whole codeword space of the UE is in fact a larger set where the set size is primarily determined by the number of possible beamforming weights. In the case of constant amplitude beamforming, the set size is determined by the number of phase shifter bits and the array size.

Figure 14:
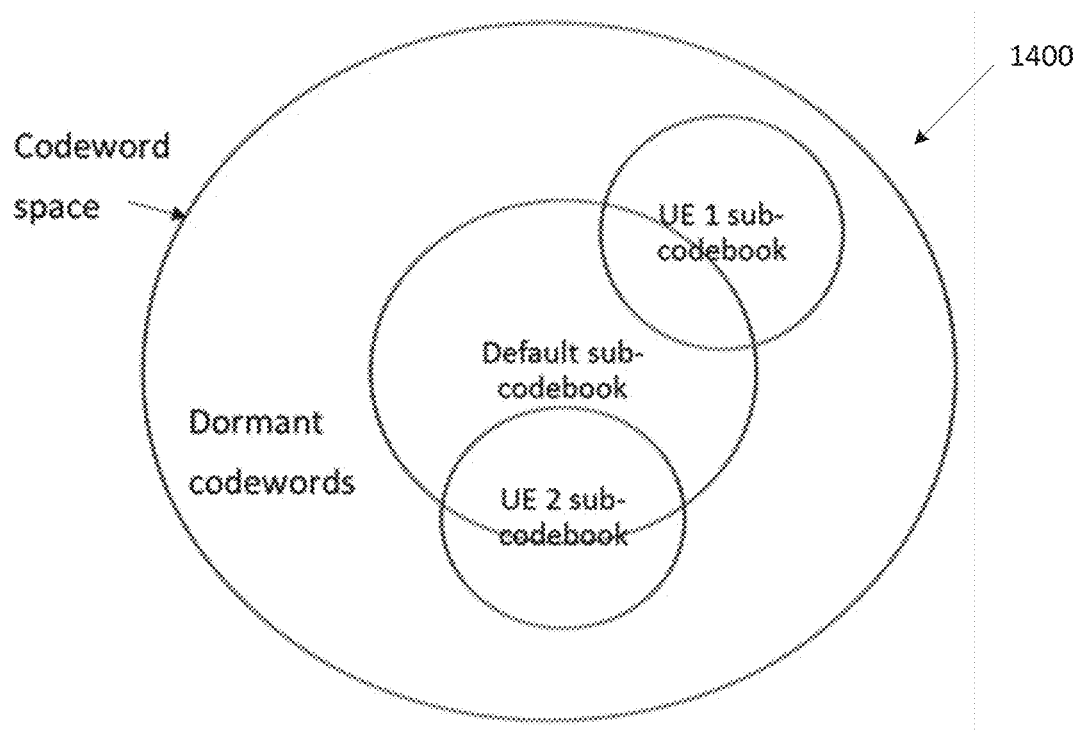
FIG. 14 illustrates another example UE-specific beam sub-codebook according to embodiments of the present disclosure.

FIG. 14 illustrates another example UE-specific beam sub-codebook 1400 according to embodiments of the present disclosure. The embodiment of the UE-specific beam sub-codebook 1400 illustrated in FIG. 14 is for illustration only. FIG. 14 does not limit the scope of this disclosure to any particular implementation.

Effectively, there is a set of dormant codewords and a set of active codewords, where the initial set of active codewords is the default sub-codebook. The UE-specific condition can change the best or suitable set of active codewords. The UE-specific sub-codebook is a subset of codewords within the whole codeword space, and it may or may not overlap with the default sub-codebook or with another UE-specific sub-codebook. An example Venn diagram is shown in FIG. 14.

In one method of generating the UE-specific sub-codebook, the statistics of the RF module and the beam usage is recorded per UE, and then the sub-codebook can be derived based on the collected statistics. The statistics can be stored on the memory of the device, or it can be stored on a cloud or an external database with connection to the device. A beam is considered used if it is used for data communication. This usage of a beam for communication can be identified from the communication baseband module.

For example, assume the UE has two RF modules, namely module A and module B. It is further assumed that each module can form multiple analog beams, i.e. beam A-1 to A-K for module A; and beam B-1 to B-M for module B. The percentage, or the number of times, or the probability a beam of a RF module is selected can be recorded in a table or database such as TABLE 1 where $\Sigma_i \alpha_i=1$. There can be one table per UE, or there can be multiple tables where there is one table for a UE-specific condition per UE (described in further details later). Given a, for all i, the sub-codebook can be generated using one of the following approaches.

In one example, the sub-codebook comprises all codewords with usage rate, $\alpha_i$, greater than a certain value, e.g. 0.1. In another example, the sub-codebook is the N codewords with the N largest usage rates. In yet another example, the sub-codebook is the one with the lesser size of the sub-codebooks from such examples. The emphasis is on minimization of beam sweeping latency. In yet another example, the sub-codebook is the one with the larger size of the sub-codebooks from such examples. The emphasis is on spherical coverage performance.

In addition, the beam search sequence can be determined from $\alpha_i$, specifically, the order of search is according to the decreasing $\alpha_i$ value; in other words, the module and codebook with the largest $\alpha_i$ is searched first, followed by the second largest and so on.

TABLE 1

Usage rate of RF modules and beams

| RF module | Beam codebook | Usage rate |
|---|---|---|
| Module A | Beam A-1 | $\alpha_1$ |
| | Beam A-2 | $\alpha_2$ |
| | ... | ... |
| | Beam A-K | $\alpha_K$ |
| Module B | Beam B-1 | $\alpha_{K+1}$ |
| | Beam B-2 | $\alpha_{K+2}$ |
| | ... | ... |
| | Beam B-M | $\alpha_{K+M}$ |

Besides the beam usage rate, other metrics can also be used, such as the signal strength from using each beam (e.g. receive signal strength, in the form of RSRP), or signal-to-noise ratio (SNR) or signal-to-interference-and-noise-ratio (SINR) from using each beam.

A UE-specific condition can change over time. For example, the user may change the holding position of the device. In another example, the user might add a casing to, or change the casing of, his or her device. The change in UE-specific condition can affect the radio spherical coverage performance of the original beam sub-codebook, and a different sub-codebook may be better for the new UE-specific condition. In order to adapt to changing UE-specific condition, the method as described before can be extended such that the statistics of the beam usage can be recorded for each UE-specific condition as shown in TABLE 2.

TABLE 2

Usage rate of RF modules and beams
for each UE-specific condition

| UE specific condition | RF module | Beam codebook | Usage rate |
|---|---|---|---|
| Condition 1 | Module A | Beam A-1 | $\alpha_1$ |
| | | Beam A-2 | $\alpha_2$ |
| | | ... | ... |
| | | Beam A-K | $\alpha_K$ |
| | Module B | Beam B-1 | $\alpha_{K+1}$ |
| | | Beam B-2 | $\alpha_{K+2}$ |
| | | ... | ... |
| | | Beam B-M | $\alpha_{K+M}$ |

TABLE 2-continued

Usage rate of RF modules and beams
for each UE-specific condition

| UE specific condition | RF module | Beam codebook | Usage rate |
|---|---|---|---|
| Condition 2 | Module A | Beam A-1 | $\beta_1$ |
| | | Beam A-2 | $\beta_2$ |
| | | ... | ... |
| | | Beam A-K | $\beta_K$ |
| | Module B | Beam B-1 | $\beta_{K+1}$ |
| | | Beam B-2 | $\beta_{K+2}$ |
| | | ... | ... |
| | | Beam B-M | $\beta_{K+M}$ |

Figure 15:
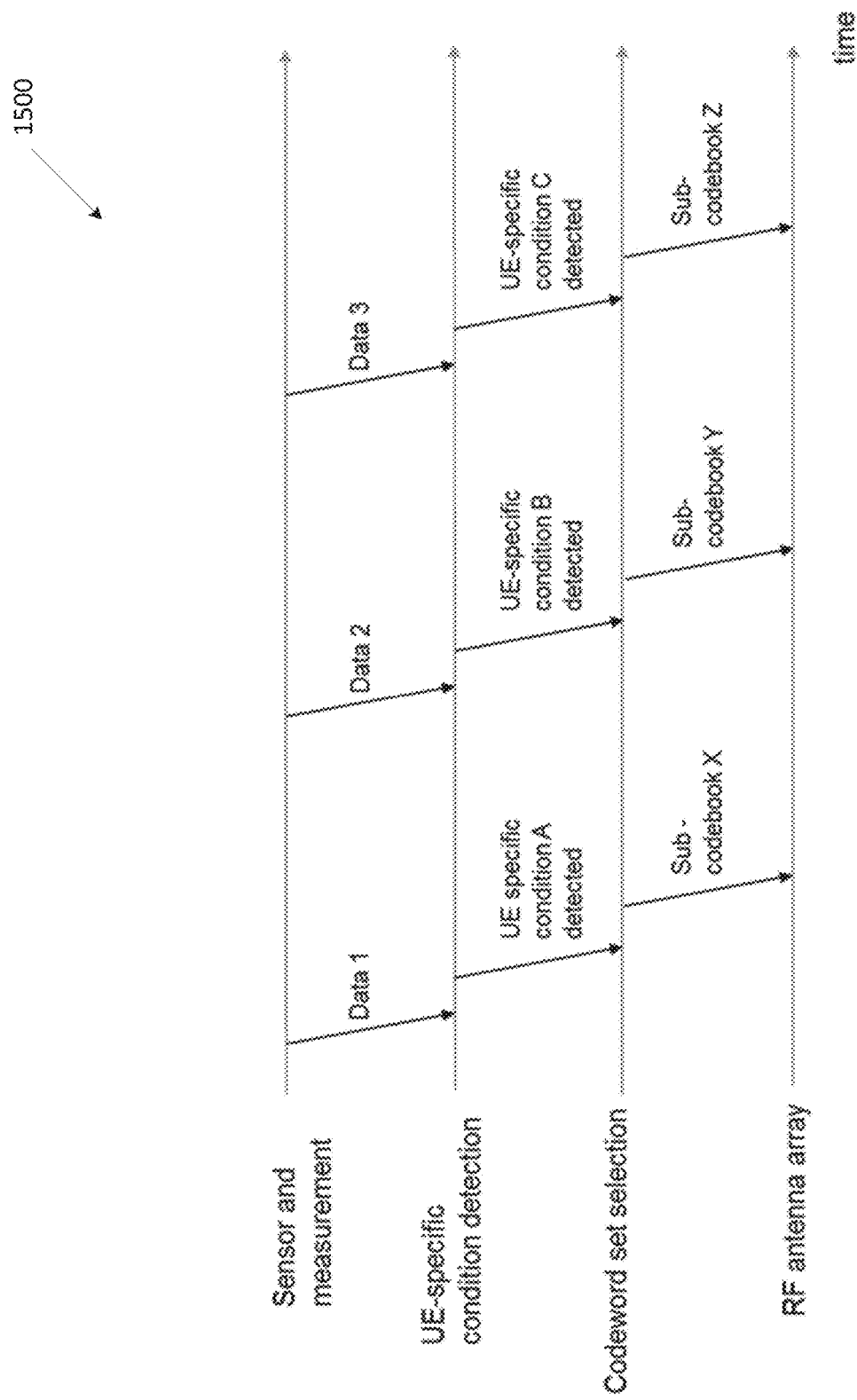
FIG. 15 illustrates an example adaptation of sub-codebook over time according to embodiments of the present disclosure.

FIG. 15 illustrates an example adaptation of sub-codebook over time 1500 according to embodiments of the present disclosure. The embodiment of the adaptation of sub-codebook over time 1500 illustrated in FIG. 15 is for illustration only. FIG. 15 does not limit the scope of this disclosure to any particular implementation.

It follows then that a sub-codebook can be generated for each UE-specific condition and depending on the detection of the UE-specific condition, the suitable sub-codebook can be utilized by the UE. Sub-codebook adaptation over time is illustrated in FIG. 15.

It can be beneficial for the terminal to enable user's assistance in the generation of UE-specific sub-codebook, which can also be called the beam training procedure. This is because the user can allow better control or set up of the targeted training condition. The beam training method can be based on the beam usage rate statistics collection and derivation of a new sub-codebook as described previously; however other beam training methods are also possible. The training for UE-specific sub-codebook may simply be referred to as beam codebook training.

Figure 16:
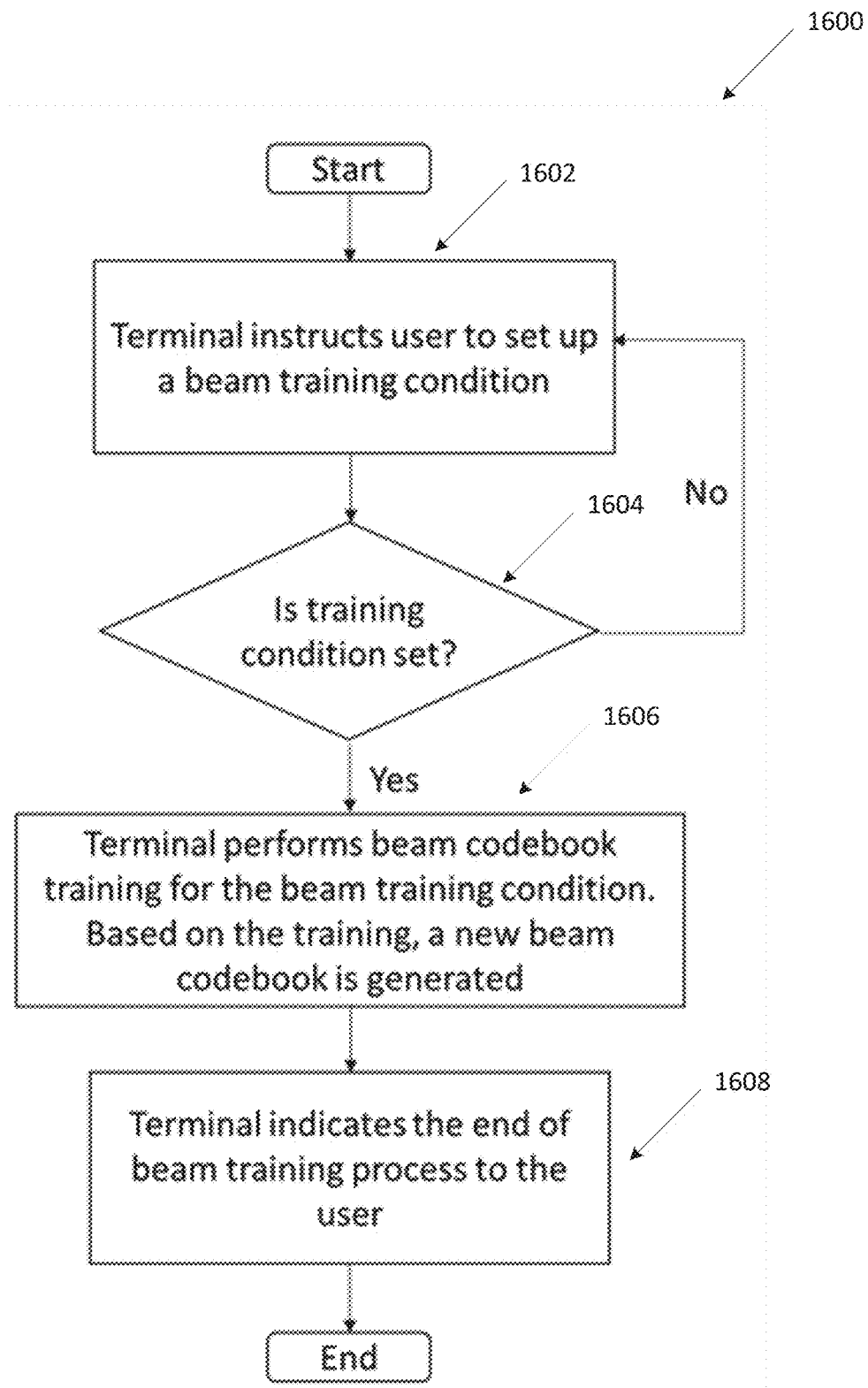
FIG. 16 illustrates an example flowchart of a method for user-assisted beam codebook training according to embodiments of the present disclosure.

FIG. 16 illustrates an example flowchart of a method 1600 for user-assisted beam codebook training according to embodiments of the present disclosure. The embodiment of the method 1600 illustrated in FIG. 16 is for illustration only. FIG. 16 does not limit the scope of this disclosure to any particular implementation.

The user-assisted beam codebook training process is illustrated in FIG. 16. The beam codebook training process involves the terminal instructing the user to set up a beam training condition. After the beam training condition is set up, the terminal performs the beam codebook training and a new beam codebook is generated. The terminal then indicates the end of training to the user.

Figure 17:
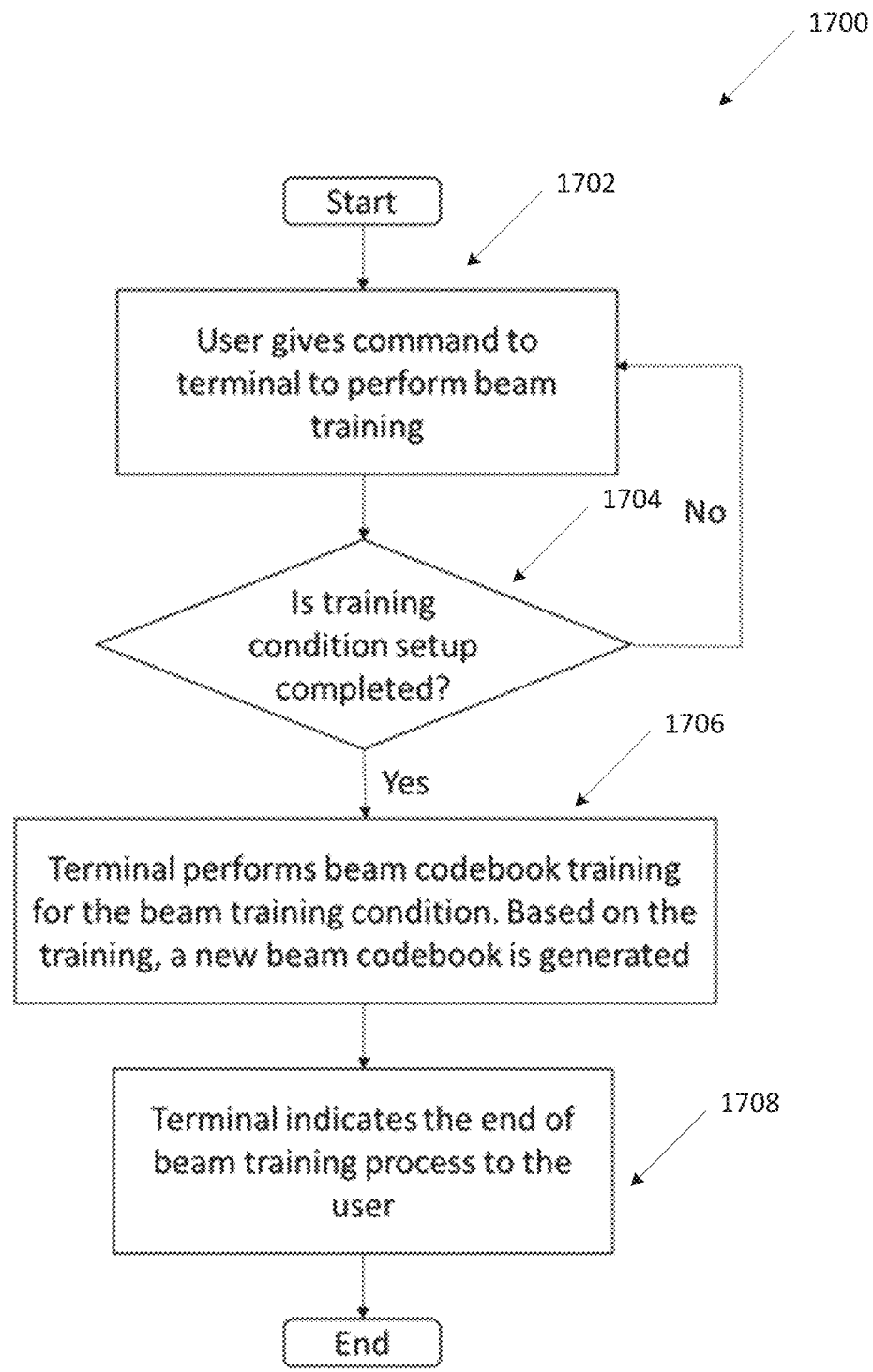
FIG. 17 illustrates another example flowchart of a method for user-assisted beam codebook training according to embodiments of the present disclosure.

FIG. 17 illustrates another example flowchart of a method 1700 for user-assisted beam codebook training according to embodiments of the present disclosure. The embodiment of the method 1700 illustrated in FIG. 17 is for illustration only. FIG. 17 does not limit the scope of this disclosure to any particular implementation.

Another exemplary user-assisted beam codebook process is illustrated in FIG. 17. In this case, the user gives the command to the terminal to perform beam training. After the beam training condition is set up, the terminal performs the beam codebook training and a new beam codebook is generated. The terminal then indicates the end of training to the user.

Figure 18:
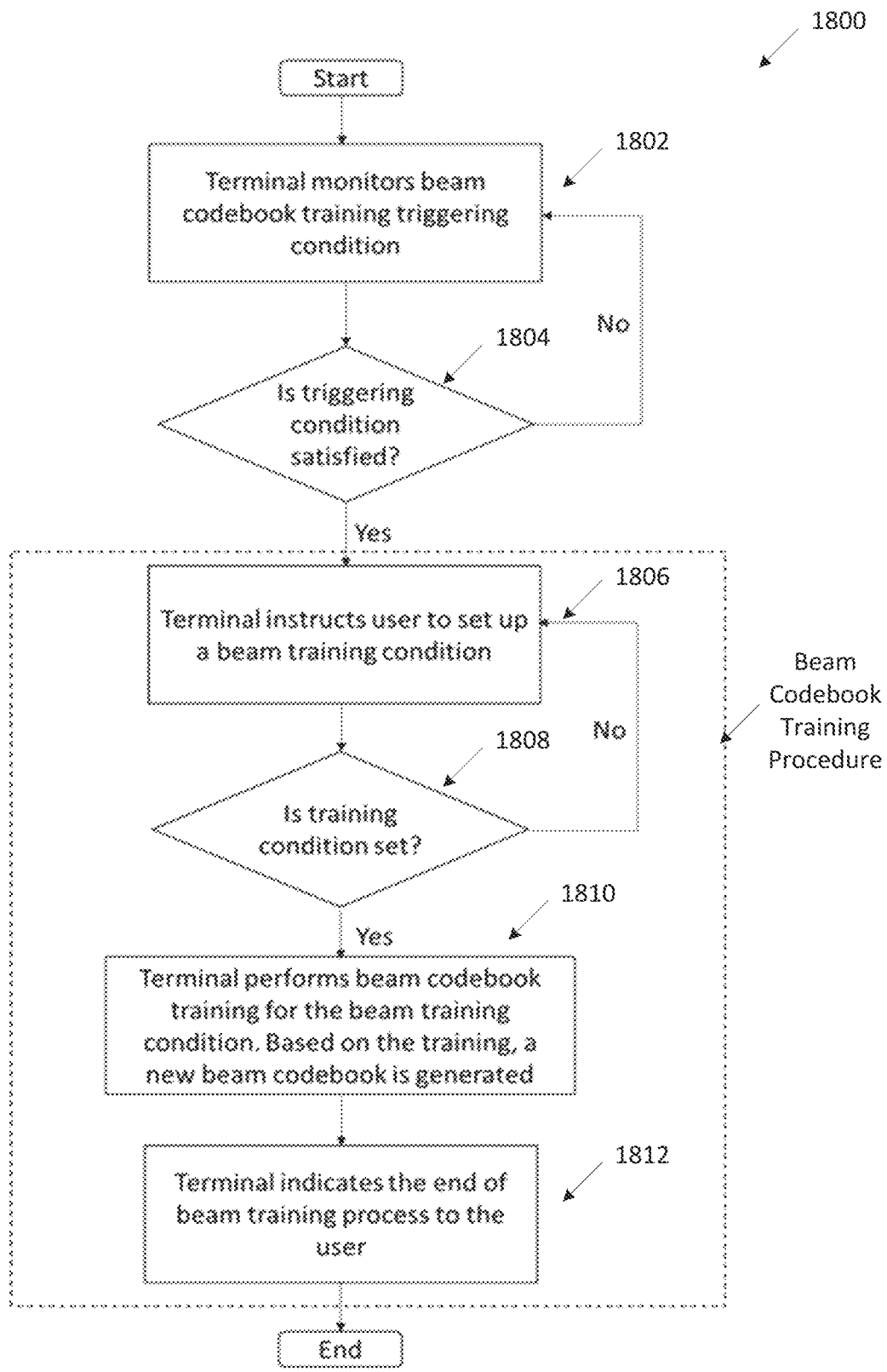
FIG. 18 illustrates yet another example flowchart of a method for user-assisted beam codebook training according to embodiments of the present disclosure.

FIG. 18 illustrates yet another example flowchart of a method 1800 for user-assisted beam codebook training according to embodiments of the present disclosure. The embodiment of the method 1800 illustrated in FIG. 18 is for illustration only. FIG. 18 does not limit the scope of this disclosure to any particular implementation.

In another embodiment, the terminal first monitors beam codebook training triggering condition. The monitoring can be continuous when the radio module is operational. It can also be periodic, or event triggered such as when the radio condition falls below a certain threshold. When a beam codebook training triggering condition is satisfied, the terminal then triggers a beam codebook training process. An exemplary procedure is shown in FIG. 18.

In this example, the beam codebook training process involves the terminal instructing the user to set up a beam training condition. After the beam training condition is set up, the terminal performs the beam codebook training and a new beam codebook is generated. The terminal then indicates the end of training to the user.

The terminal can trigger the need for beam training based on the radio performance experienced by the UE. The radio performance can be SNR, SINR, throughput, beam alignment success rate and the like. Specifically, when the radio performance is below a certain threshold, the need for the beam training process can be triggered. This implies sufficiently poor performance, the threshold for triggering condition is different from the threshold used for event based triggering condition monitoring.

Figure 19:
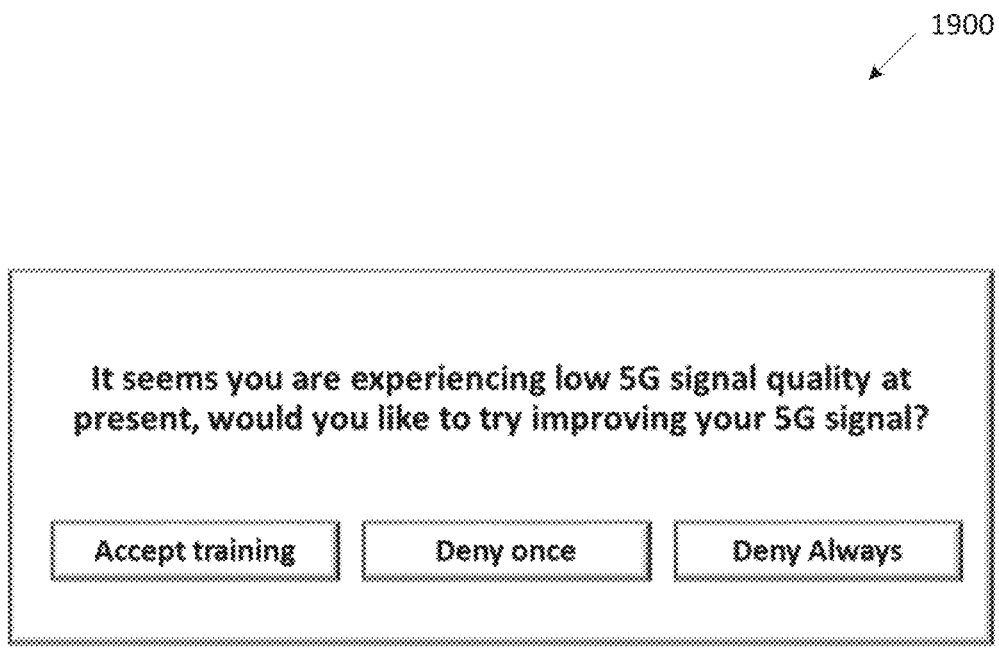
FIG. 19 illustrates an example beam training trigger based on radio signal quality according to embodiments of the present disclosure.

FIG. 19 illustrates an example beam training trigger 1900 based on radio signal quality according to embodiments of the present disclosure. The embodiment of the beam training trigger 1900 illustrated in FIG. 19 is for illustration only. FIG. 19 does not limit the scope of this disclosure to any particular implementation.

When the need for beam training is triggered, a message can appear on the user's device screen to ask for the user's permission to conduct beam training. An example message is as shown in FIG. 19. Beam training is initiated if the user accepts the invitation/instruction, otherwise it is not initiated. The beam training condition is essentially sufficiently low radio performance and the subsequent consent of user to beam training. The beam codebook training can also be automatically executed by the terminal (i.e. without the need for user's consent) after the radio condition is met. In one alternative, the first beam training requires user's explicit indication of consent and an option is provided to the user to automatically consent to subsequent beam training requests.

Figure 20:
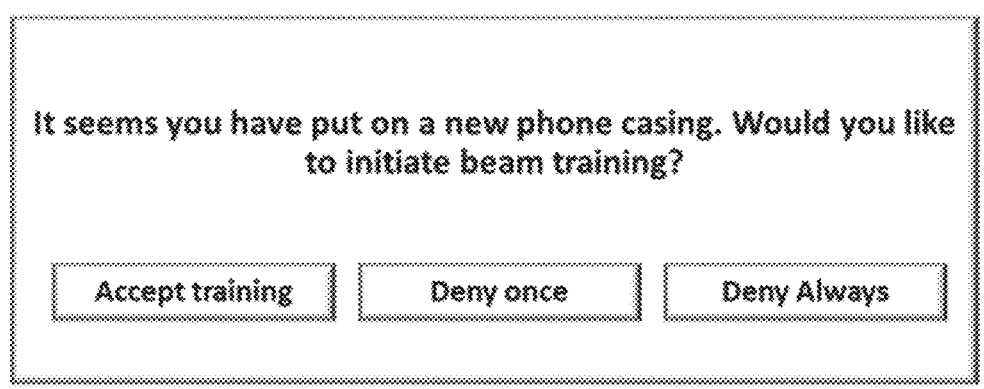
FIG. 20 illustrates an example beam training trigger based on detection of phone casing according to embodiments of the present disclosure.

FIG. 20 illustrates an example beam training trigger 2000 based on detection of phone casing according to embodiments of the present disclosure. The embodiment of the beam training trigger 2000 illustrated in FIG. 20 is for illustration only. FIG. 20 does not limit the scope of this disclosure to any particular implementation.

Another trigger condition for the beam training process can be the detection of a change on the terminal that requires beam training such as a new phone casing has been put on, or the phone casing has been removed. This can be detected using one or more sensors on the phone such as the touch sensors (e.g. capacitive touch sensors). An example message is shown in FIG. 20. The beam training condition is essentially sensor trigger and the subsequent consent of user to beam training.

The user can also proactively trigger the beam training process by navigating the user interface menu to the button or setting that triggers the beam training process. The beam training condition is user trigger in this case.

Upon initiation of beam training by the user or by the terminal, the terminal can guide user through the beam training process. One or more of the following beam training conditions can be asked of the user by the terminal.

In one example of training condition 1, beam training for one or more mechanical cases includes but not limited to the following: (case 1) device lying flat on a horizontal surface (e.g. on a table) with the display screen facing up; (case 2) device lying flat on a horizontal surface (e.g. on a table) with the display screen facing down; (case 3) device being held in portrait mode (e.g., user's preferred hand and user's less preferred hand); (case 4) device being held in landscape mode (e.g., no tilt, right tilt, left tilt); (case 5) device being held beside head and hand (e.g., user's preferred hand user's less preferred hand).

In one example of training condition 2 for beam training for one or more location, the user is asked to walk around an area while holding the device with a fixed position, e.g. with one of the holding positions as described in training condition 1.

In one example of training condition 3, the user is asked to walk around an area while changing the device holding positions, e.g. with the holding positions as described in training condition 1.

Sensors on the phone can be used to determine if the training condition has been set up properly. For example, gyroscope can be used to determine if Case 1 has been set up. Proximity sensor and/or touch sensor can be used to determine if Case 5 has been set up. If the condition is determined to not have been set up, the terminal can repeat the guidance or instruction to the user, or to provide further guidance or instruction to the user.

An image, a video, a sound, a vibration or a combination thereof can be used to guide the user in going through the training conditions and to inform the user of the completion of beam training. The choice of image, video, sound or a combination can depend on the training condition. For example, image, video or vibration can be used to inform the user of the completion of training condition 1 case 1 (since the user can see the screen in this case) and the next training condition to be conducted; while sound or vibration can be used to inform the user of the completion of training condition case 2 (since the user cannot see the screen in this case).

In another embodiment, upon initiation of beam training by the user or by the terminal, the user can directly define the training condition by explicitly presenting to the terminal the desired training condition (e.g. by holding the terminal is a particular fashion). This enables the user's own determination of the problematic radio condition.

It is noted that the beam codebook training procedure can also be extended in a straightforward manner to training of the beam sweeping or beam searching sequence to reduce beam sweeping or beam searching latency. Instead of beam codebook, the output of the training is beam sweeping or beam searching sequence. The training can also be for both the beam codebook as well as the beam sweeping/searching sequence.

Figure 21:
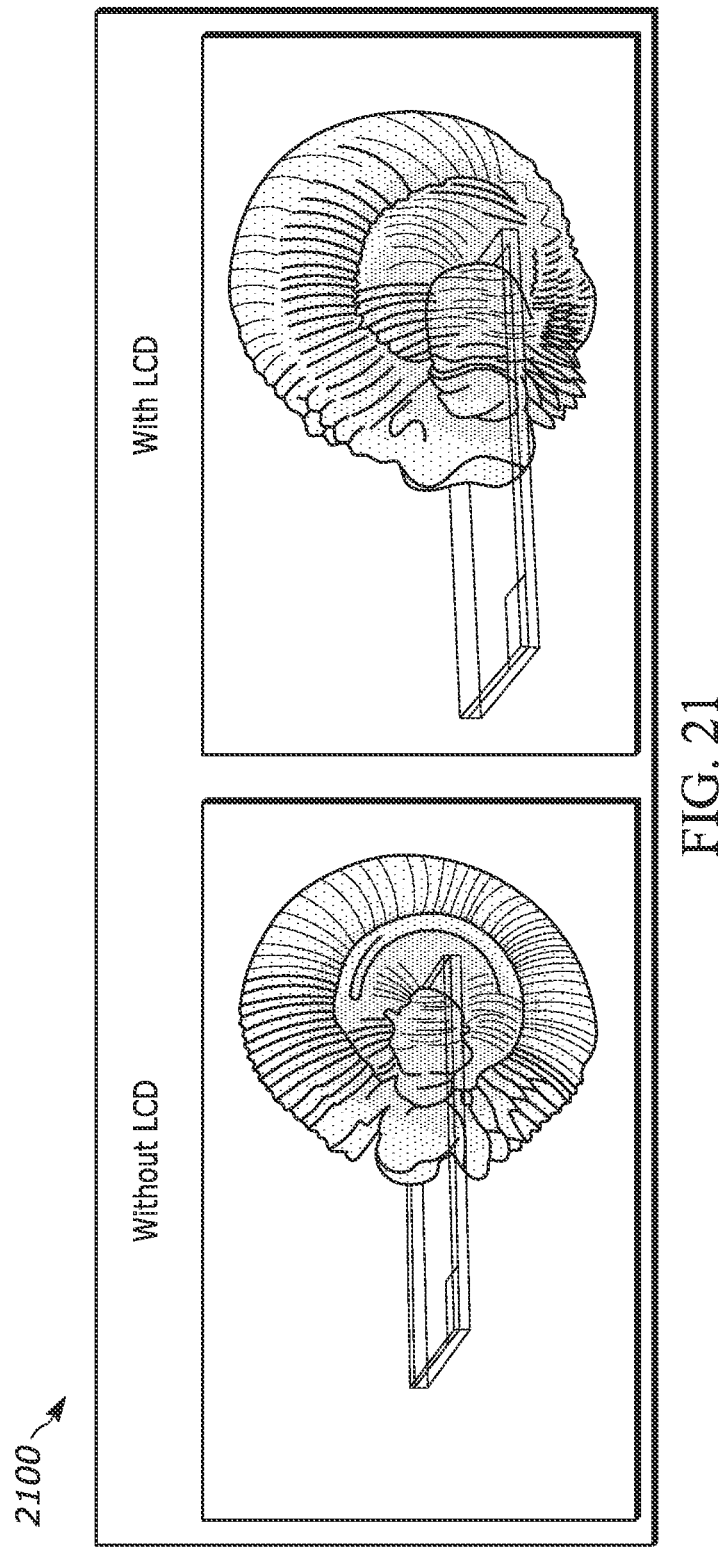
FIG. 21 illustrates an example impact of LCD to the UE TX/RX radiation gain pattern according to embodiments of the present disclosure.

FIG. 21 illustrates an example impact of LCD to the UE TX/RX radiation gain pattern 2100 according to embodiments of the present disclosure. The embodiment of the impact of LCD to the UE TX/RX radiation gain pattern 2100 illustrated in FIG. 21 is for illustration only. FIG. 21 does not limit the scope of this disclosure to any particular implementation.

FIG. 21 shows an example of the impact of having a full LCD display covering one side of the UE on the UE's Rx/Tx radiation gain pattern. The impact of the hand grip and human body on the radiation pattern is similar, i.e. the radio energy is significantly impacted by the proximity of human skin to the antenna modules; in particular, the signal received/transmitted by antenna suffers from significant loss if the signal has to propagate through human skin. If the UE is equipped with multiple antenna modules, e.g. located at the four corners (or subset) of the rectangular UE, the set of antenna modules that may be turned on to receive or transmit signals can be highly dependent on how the device is being handled by the user. Some examples are illustrated in FIG. 22.

Figure 22:
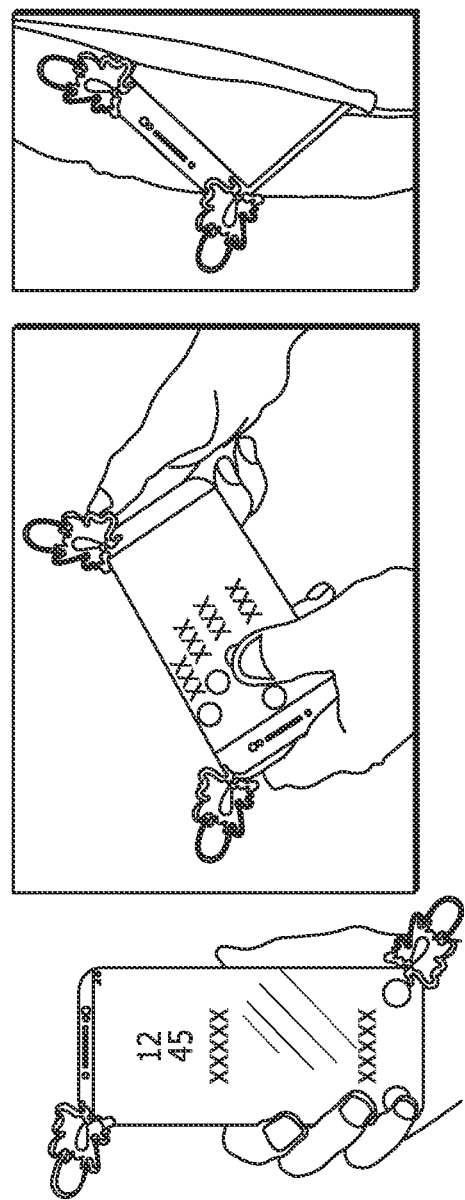
FIG. 22 illustrates an example antenna activation based on device handling according to embodiments of the present disclosure.

FIG. 22 illustrates an example antenna modules activation 2200 based on device handling according to embodiments of the present disclosure. The embodiment of the antenna modules activation 2200 illustrated in FIG. 22 is for illustration only. FIG. 22 does not limit the scope of this disclosure to any particular implementation.

Figure 23:
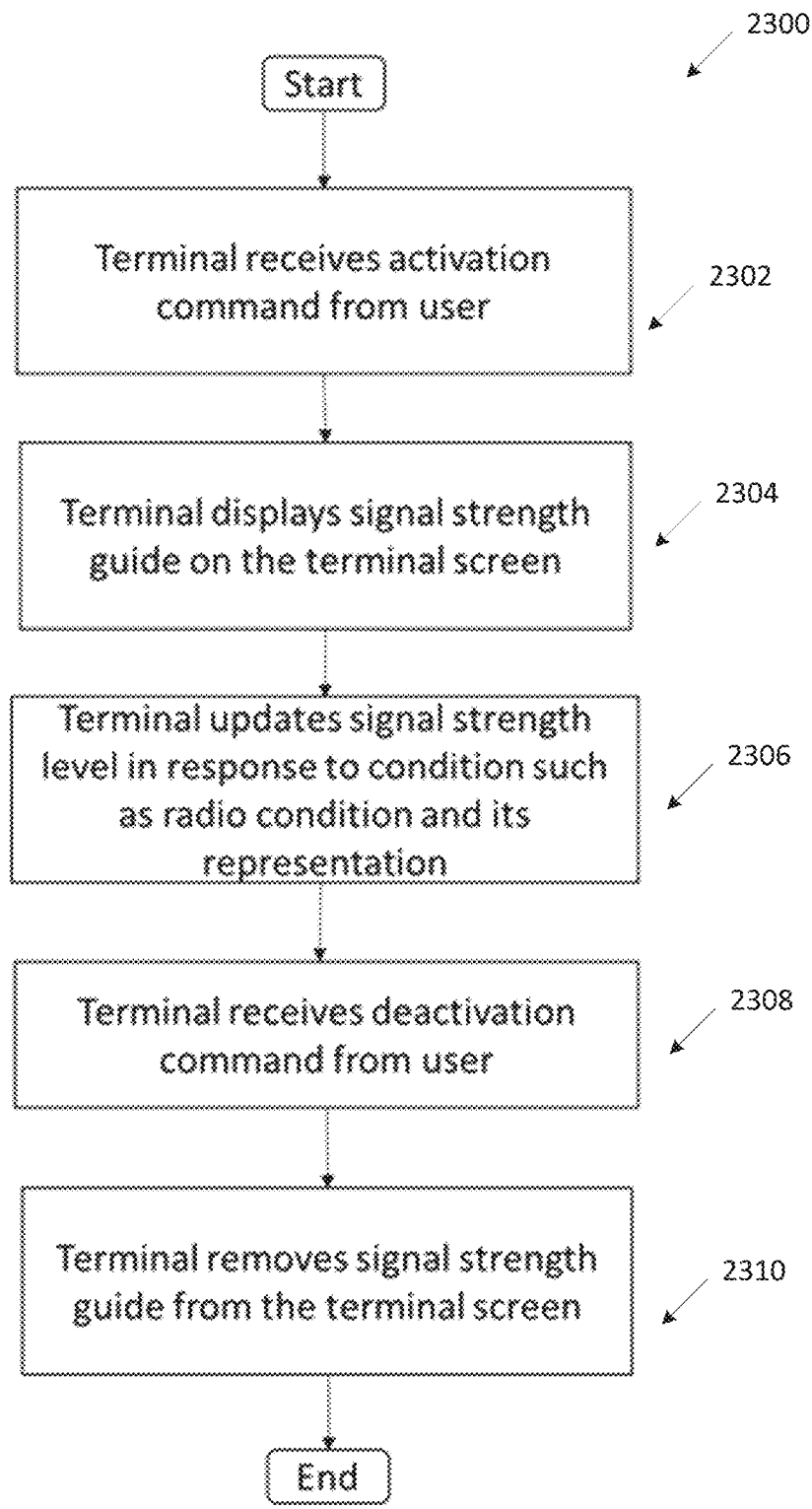
FIG. 23 illustrates a flow chart of a method for a terminal operation according to embodiments of the present disclosure.

FIG. 23 illustrates a flow chart of a method 2300 for a terminal operation according to embodiments of the present disclosure. The embodiment of the method 2300 illustrated in FIG. 23 is for illustration only. FIG. 23 does not limit the scope of this disclosure to any particular implementation.

Figure 24:
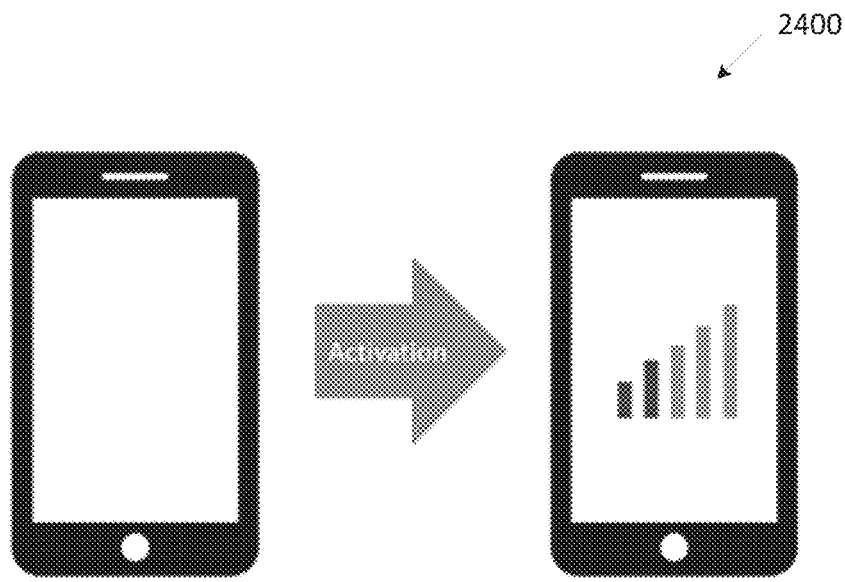
FIG. 24 illustrates an example before activation and after activation according to embodiments of the present disclosure.

FIG. 23 describes an exemplary procedure. Upon receiving an activation command, the terminal displays a signal indicator on the screen. The indicator can be displayed large at the center of the screen or occupy a significant area of the screen to maximize the visual impact. It may be referred it as "signal strength guide." An example is the signal bar as shown in FIG. 24. Other visual representation of the signal strength is also possible. The terminal removes the signal indicator from the screen after the user sends a deactivation command.

FIG. 24 illustrates an example before activation and after activation 2400 according to embodiments of the present disclosure. The embodiment of the before activation and after activation 2400 illustrated in FIG. 24 is for illustration only. FIG. 24 does not limit the scope of this disclosure to any particular implementation.

Figure 25:
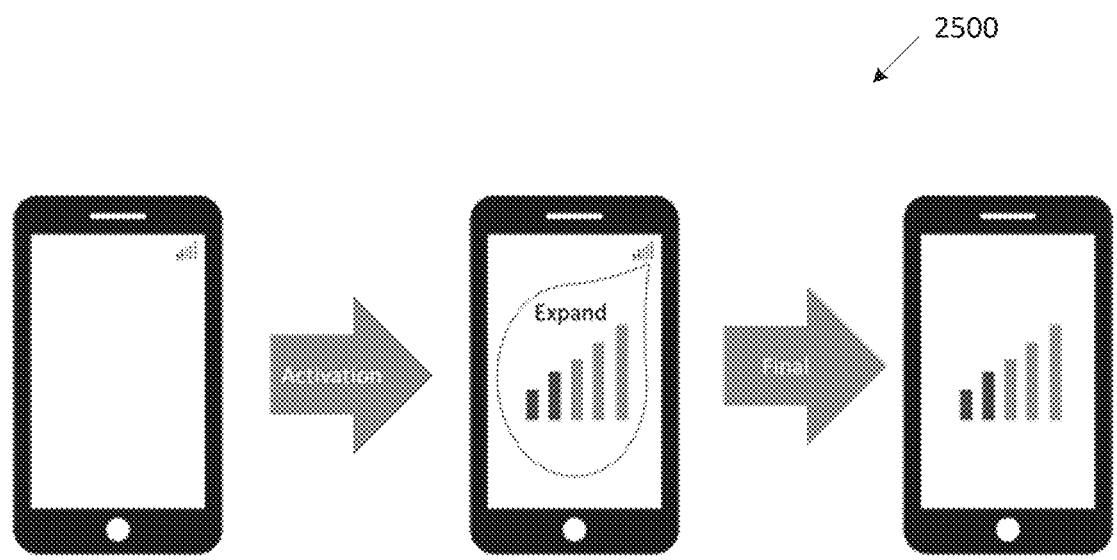
FIG. 25 illustrates an example before activation, immediately after activation, final steady state after activation according to embodiments of the present disclosure.

FIG. 25 illustrates an example before activation, immediately after activation, final steady state after activation 2500 according to embodiments of the present disclosure. The embodiment of the before activation, immediately after activation, final steady state after activation 2500 illustrated in FIG. 25 is for illustration only. FIG. 25 does not limit the scope of this disclosure to any particular implementation.

In another option, the signal indicator is located at a corner of the terminal (e.g. top right hand corner), which can be the same as the conventional signal indicator. After activation, the signal indicator is expanded (or "grow") to occupy the center of the screen or the designated area of the screen as the "signal strength guide."

After the display of signal strength guide, the terminal may determine the present condition such as the radio condition or other representation of the radio condition, and update the signal strength display in real time or with a certain periodicity. The change in radio condition representation can be caused by the user touching/blocking different area of the phone, or changing holding positions.

Figure 26:
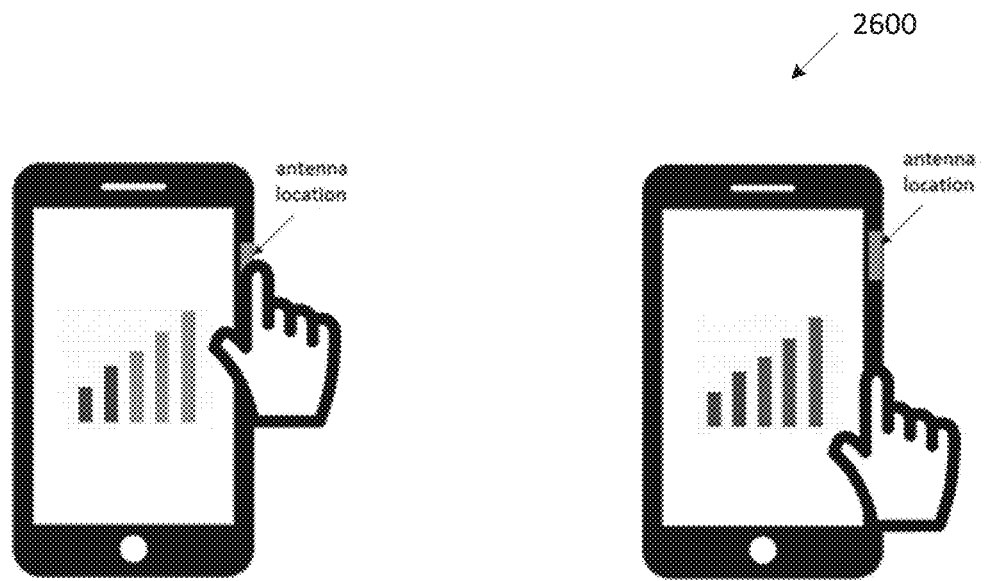
FIG. 26 illustrates an example weak signal when the finger is touching/blocking the antenna according to embodiments of the present disclosure.

FIG. 26 illustrates an example weak signal 2600 when the finger is touching/blocking the antenna according to embodiments of the present disclosure. The embodiment of the weak signal 2600 illustrated in FIG. 26 is for illustration only. FIG. 26 does not limit the scope of this disclosure to any particular implementation.

The effect is illustrated in FIG. 26. On the left of FIG. 26, when the user touches/blocks an area on top of the antenna module, which in turn can cause significant signal degradation, the signal strength guide displays a state of weak signal. On the other hand, on the right of FIG. 26, when the user touches/blocks an area away from the antenna module, the signal strength guide displays a state of strong signal.

Figure 27:
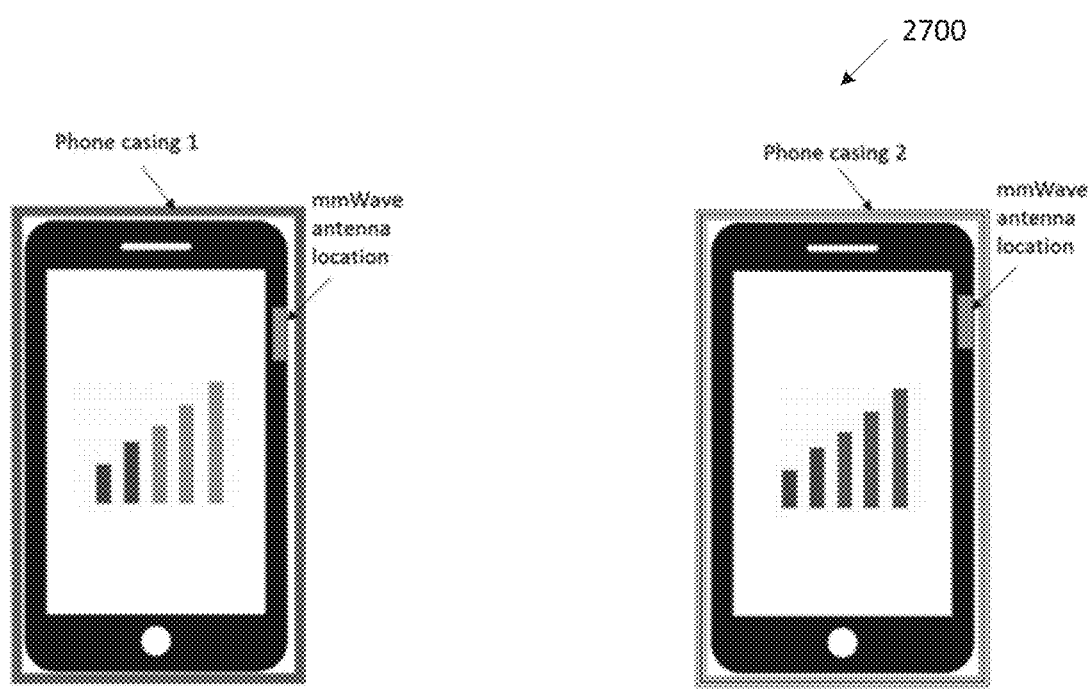
FIG. 27 illustrates an example weak signal when the phone casing 1 is used according to embodiments of the present disclosure.

FIG. 27 illustrates an example weak signal 2700 when the phone casing 1 is used according to embodiments of the present disclosure. The embodiment of the weak signal 2700 illustrated in FIG. 27 is for illustration only. FIG. 27 does not limit the scope of this disclosure to any particular implementation.

The terminal can also estimate the signal strength as a result of putting on a phone casing to evaluate the impact of the phone casing material and design on the radio performance. The effect is illustrated in FIG. 27. On the left of FIG. 27, when phone casing 1 is used, the signal strength guide displays a state of weak signal. On the other hand, on the right of FIG. 27, when phone casing 2 is used, the signal strength guide displays a state of strong signal.

The signal strength level in signal strength guide can be calculated or derived from the same input used for the conventional signal strength indicator typically found on the top right hand corner of the phone. However, the signal strength level can also be calculated or derived differently than the one used for the conventional signal strength indicator. There are several possible reasons or benefits for this. For example, assuming the signal strength guide is displaying mmWave signal strength.

In one example, the conventional signal strength indicator may combine the radio effect of all frequency bands used for wireless connectivity by the phone, e.g. in both lower frequency band such as sub-GHz bands and the mmWave band. However the mmWave signal strength guide may only represent the signal strength of the mmWave band.

In another example, the conventional signal strength indicator may employ some measurement averaging over time and hence may react more slowly to any blockage. However, it can be more useful for the user if the mmWave signal strength guide reacts faster to any blockage to provide the user accurate and more instant understanding.

In yet another example, the mmWave signal strength guide can obtain signals from sources other than the radio module, which can also serve as the predictor or estimator to the mmWave radio condition. For example, the signal strength can be derived by jointly using the output of one or multiple sensors such as touch sensor, proximity sensor, fingerprint sensor placed near the mmWave antenna module, or the output of WiGig based detection module, based on a mathematical formula or a mapping table pre-determined and stored on the terminal. Other sensor type is not precluded. An example procedure flowchart is shown in FIG. 28.

Figure 28:
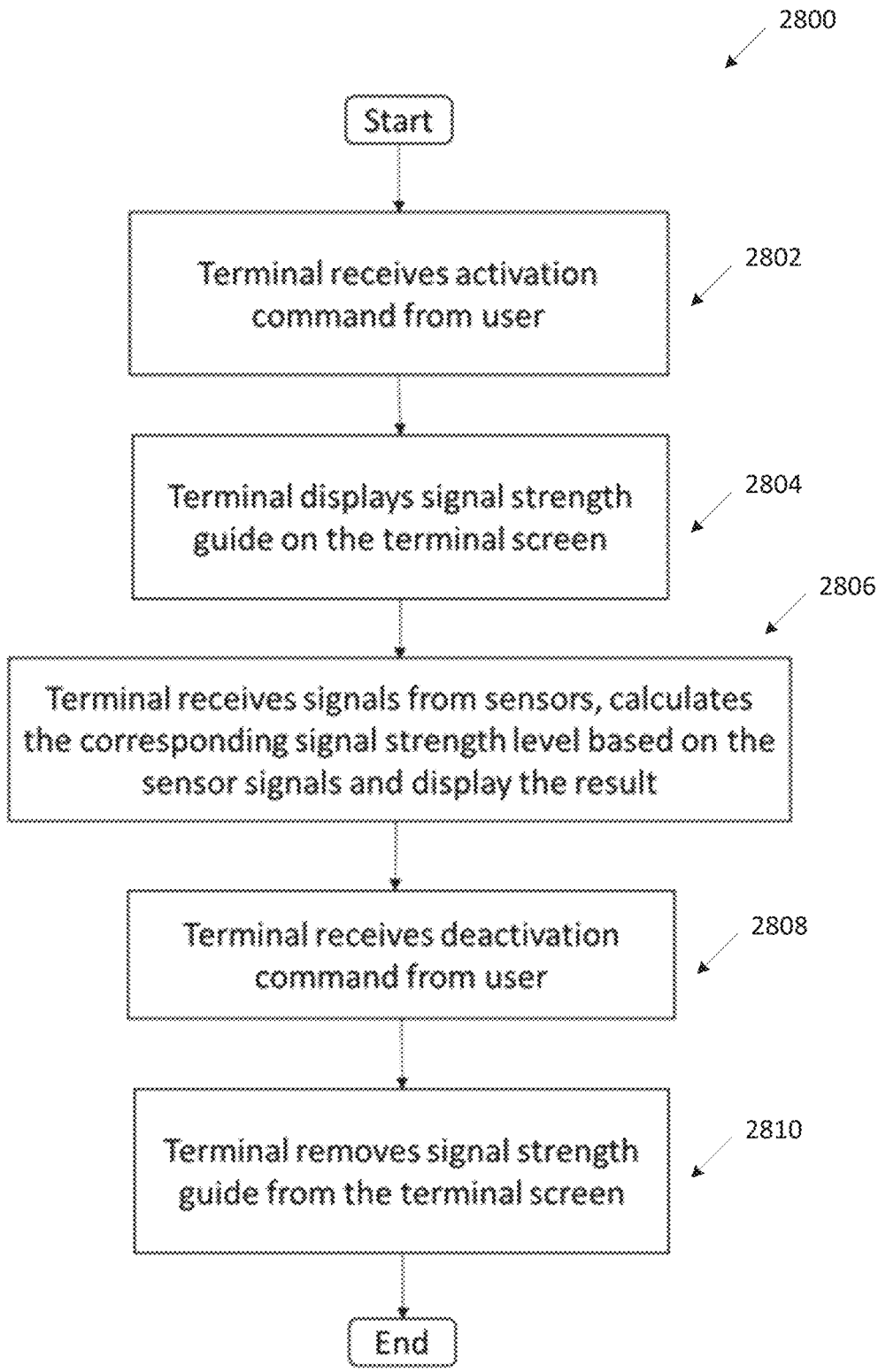
FIG. 28 illustrates a flow chart of a method for a terminal operation according to embodiments of the present disclosure.

FIG. 28 illustrates a flow chart of a method 2800 for a terminal operation according to embodiments of the present disclosure. The embodiment of the method 2800 illustrated in FIG. 28 is for illustration only. FIG. 28 does not limit the scope of this disclosure to any particular implementation.

Figure 29:
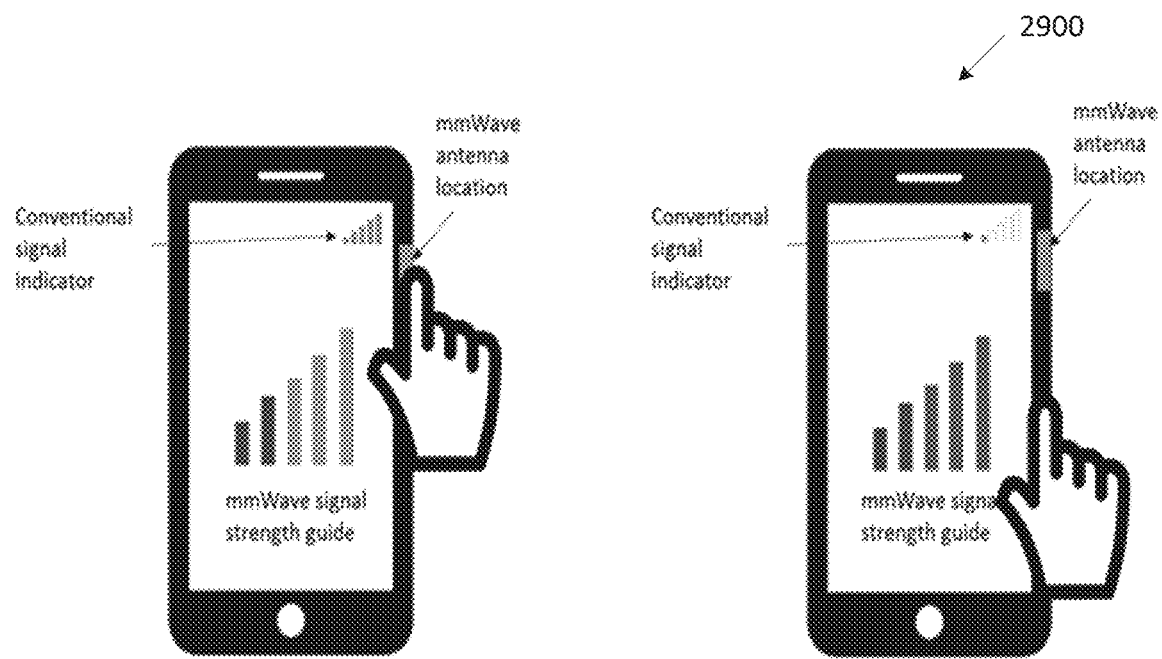
FIG. 29 illustrates an example conventional signal indicator and mmWave signal strength guide according to embodiments of the present disclosure.

For the above the reasons, the mmWave signal strength guide can be displayed separately from the conventional signal indicator and the mmWave signal strength guide does not necessarily show the same strength level to the user, as shown in FIG. 29.

FIG. 29 illustrates an example conventional signal indicator 2900 and mmWave signal strength guide according to embodiments of the present disclosure. The embodiment of the conventional signal indicator 2900 illustrated in FIG. 29 is for illustration only. FIG. 29 does not limit the scope of this disclosure to any particular implementation.

Figure 30:
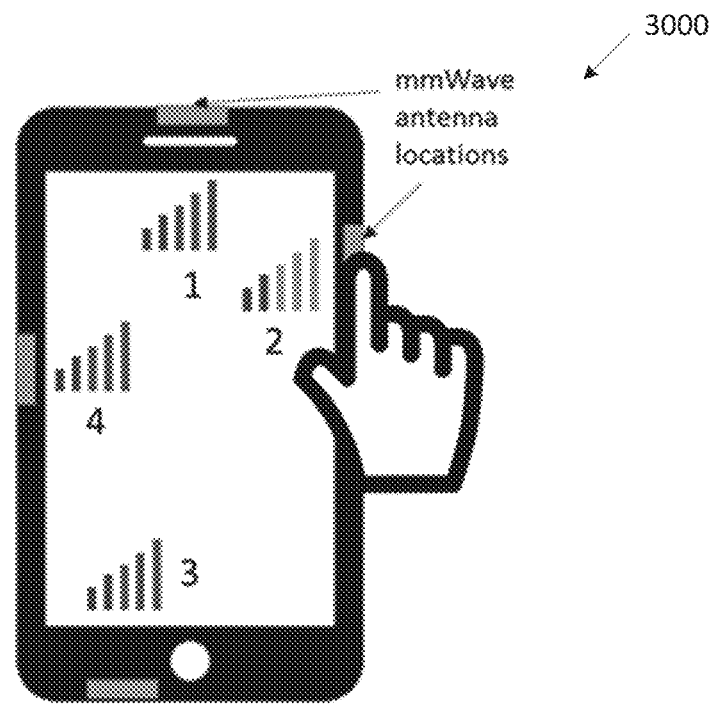
FIG. 30 illustrates an example multiple mmWave signal strength guides according to embodiments of the present disclosure.

Furthermore, for the terminal equipped with more than one mmWave antenna module, there can be one mmWave signal strength guide dedicated to present the radio condition for each mmWave antenna module. This is shown in FIG. 30, where there is one signal strength guide near each mmWave antenna module to represent the radio condition of the nearest antenna module. Alternatively, there is only one mmWave signal strength guide used to represent the overall or combined radio condition of all mmWave antenna modules.

FIG. 30 illustrates an example multiple mmWave signal strength guides 3000 according to embodiments of the present disclosure. The embodiment of the multiple mmWave signal strength guides 3000 illustrated in FIG. 30 is for illustration only. FIG. 30 does not limit the scope of this disclosure to any particular implementation.

When signal strength reaches a certain level, a certain number of signal bars is colored (or occupied). In one option, the color of the occupied signal bar changes according to the number of occupied bars. For example, the color is red if the number of occupied signal bars is fewer than an integer X, the color is yellow if the number of occupied signal bars is greater than X but fewer than an integer Y (Y>X), and the color is green if the number of occupied signal bars is greater than Y. In addition, text such as "bad," "medium" or "good" can also appear on the terminal screen to provide additional visual guidance.

Besides the visual display of the signal strength, other embodiments to indicate the signal strength are also possible. For example, instead of the visual signal indicator, a sound can be emitted if the user is touching an area which results in signal loss greater than a threshold. In another example, a vibration is produced if the user is touching an area which results in signal loss greater than a threshold.

In another embodiment, upon activation, regions near the mmWave antenna modules can be highlighted or marked to inform the user the regions to avoid (typically near the edges of the phone). The procedure is described in FIG. 31. An illustration of the screen display is given in FIG. 32. In addition to the highlighting, a tip in the form of text can appear to provide information to the user to avoid touching or blocking the highlighted areas.

Figure 31:
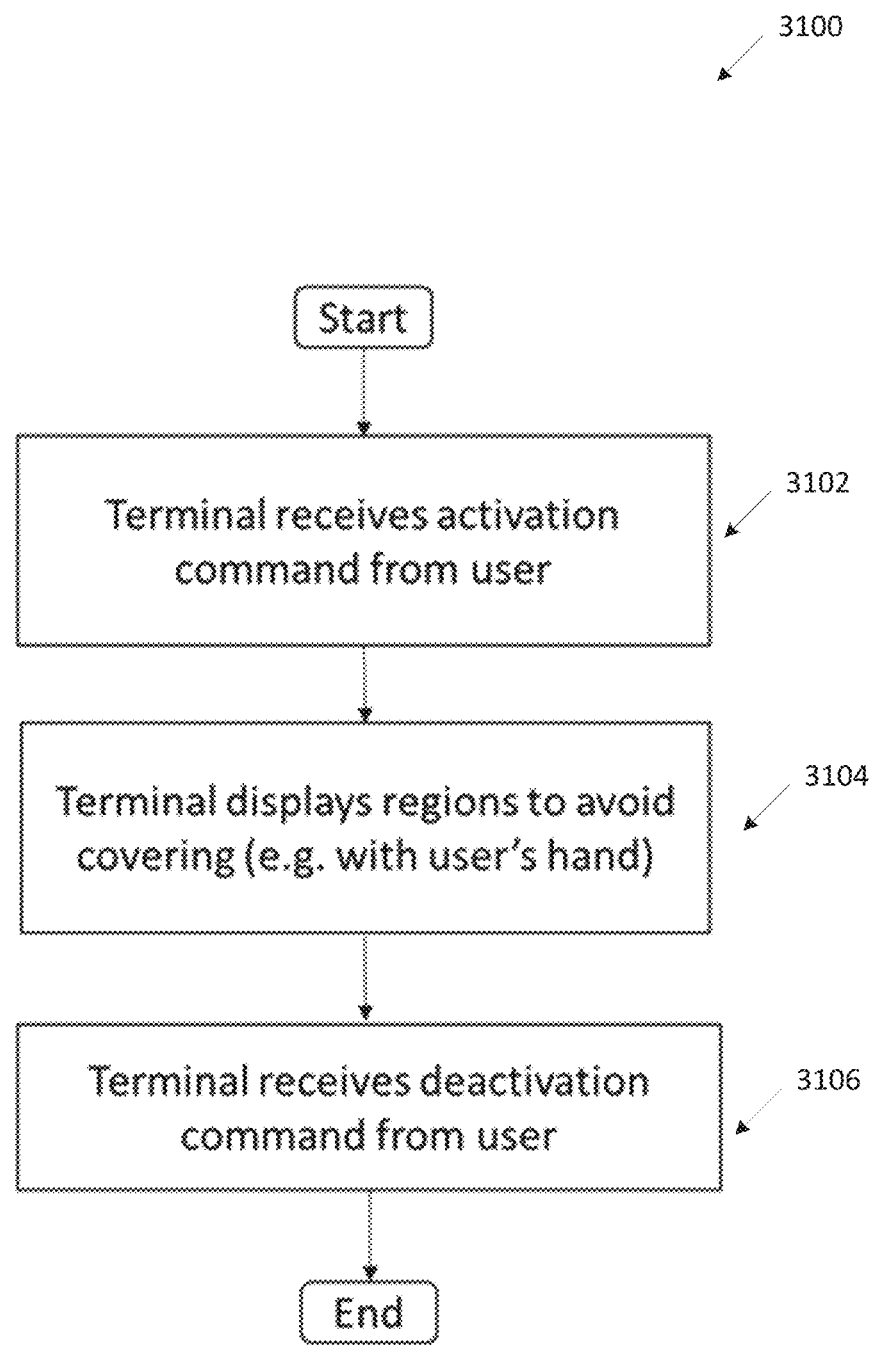
FIG. 31 illustrates a flow chart of a method for a terminal operation according to embodiments of the present disclosure.

FIG. 31 illustrates a flow chart of a method 3100 for a terminal operation according to embodiments of the present disclosure. The embodiment of the method 3100 illustrated in FIG. 31 is for illustration only. FIG. 31 does not limit the scope of this disclosure to any particular implementation.

Figure 32:
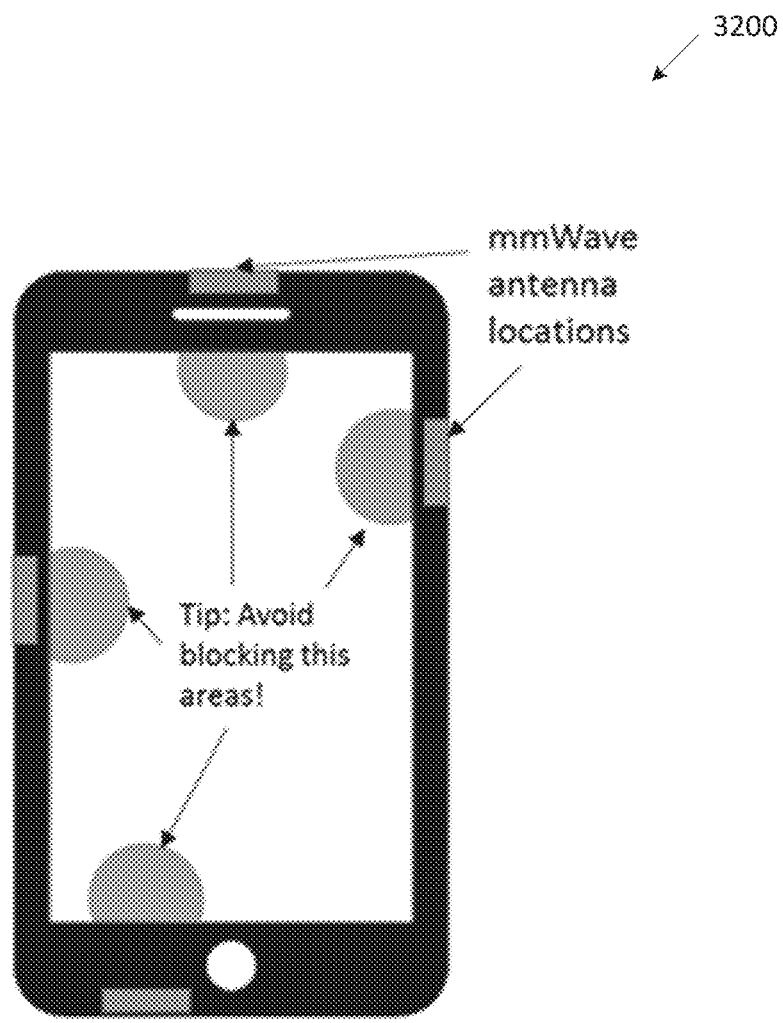
FIG. 32 illustrates an example marking on screen to inform user to avoid touching the areas marked according to embodiments of the present disclosure.

FIG. 32 illustrates an example marking on screen 3200 to inform user to avoid touching the areas marked according to embodiments of the present disclosure. The embodiment of the marking on screen 3200 illustrated in FIG. 32 is for illustration only. FIG. 32 does not limit the scope of this disclosure to any particular implementation.

In one embodiment, the terminal detects a blockage condition (e.g. by hand), a process is initiated to guide the user to remove the blockage condition. In addition to the blockage condition, other condition can also be required before the process to remove the blockage condition is initiated.

For example, the additional condition can be degradation of radio performance exceeding a certain threshold. The detection of the blockage condition can be determined based on inputs from the RF module, the modem module or sensors (such as touch sensor, proximity sensor, finger print sensor). Upon detection of the condition that initiates the process, the terminal guides the user to remove the blockage condition. If the condition is successfully removed, the process is terminated, else the guidance continues to operate or further guidance is provided. An exemplary procedure is given in FIG. 33.

Figure 33:
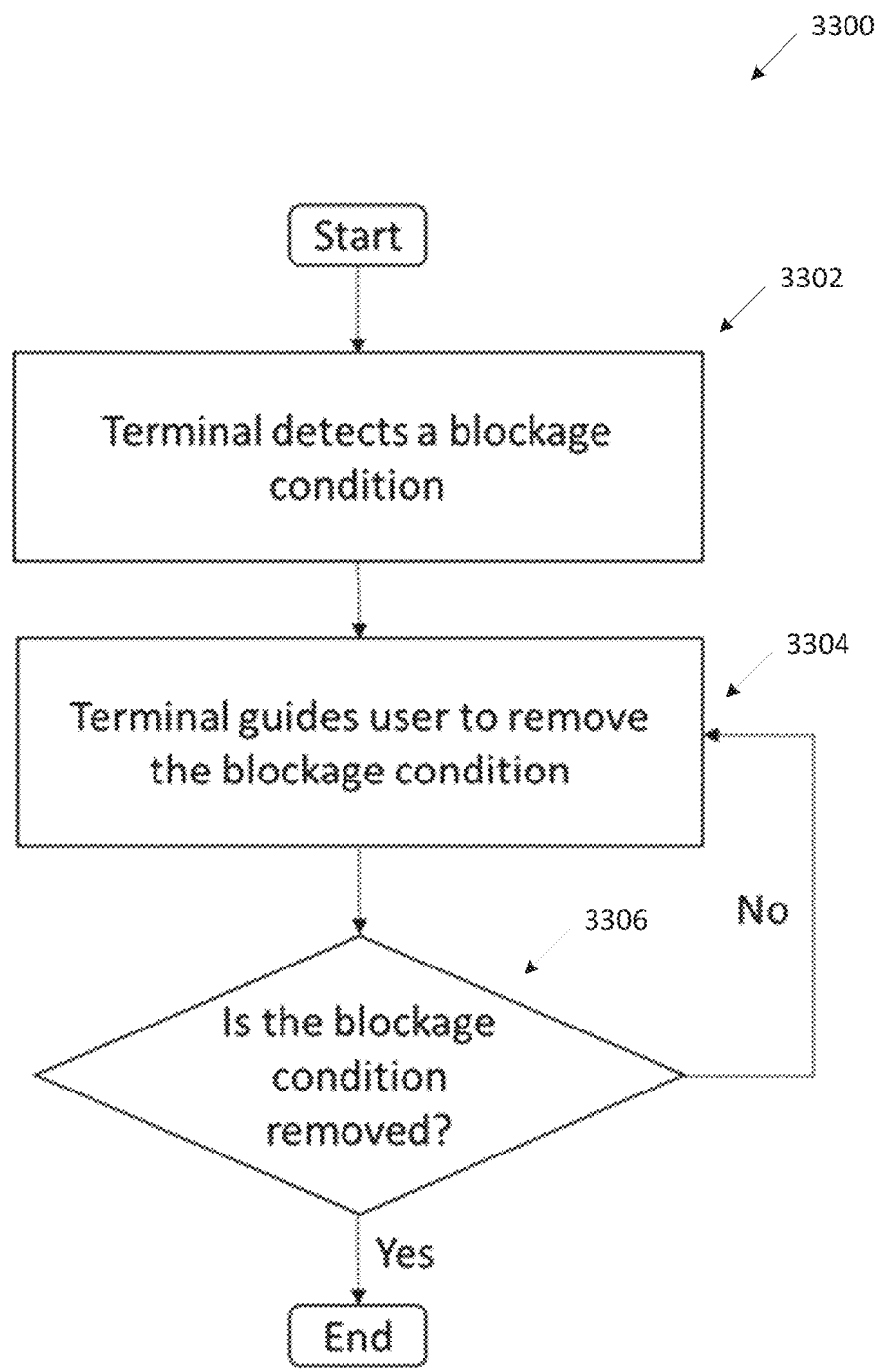
FIG. 33 illustrates a flow chart of a method for a terminal operation according to embodiments of the present disclosure.

FIG. 33 illustrates a flow chart of a method 3300 for a terminal operation according to embodiments of the present disclosure. The embodiment of the method 3300 illustrated in FIG. 33 is for illustration only. FIG. 33 does not limit the scope of this disclosure to any particular implementation.

In one embodiment of the terminal guidance, a message appears on the user interface requesting the user to move the hand/finger from undesirable location. An example is shown in FIG. 34.

Figure 34:
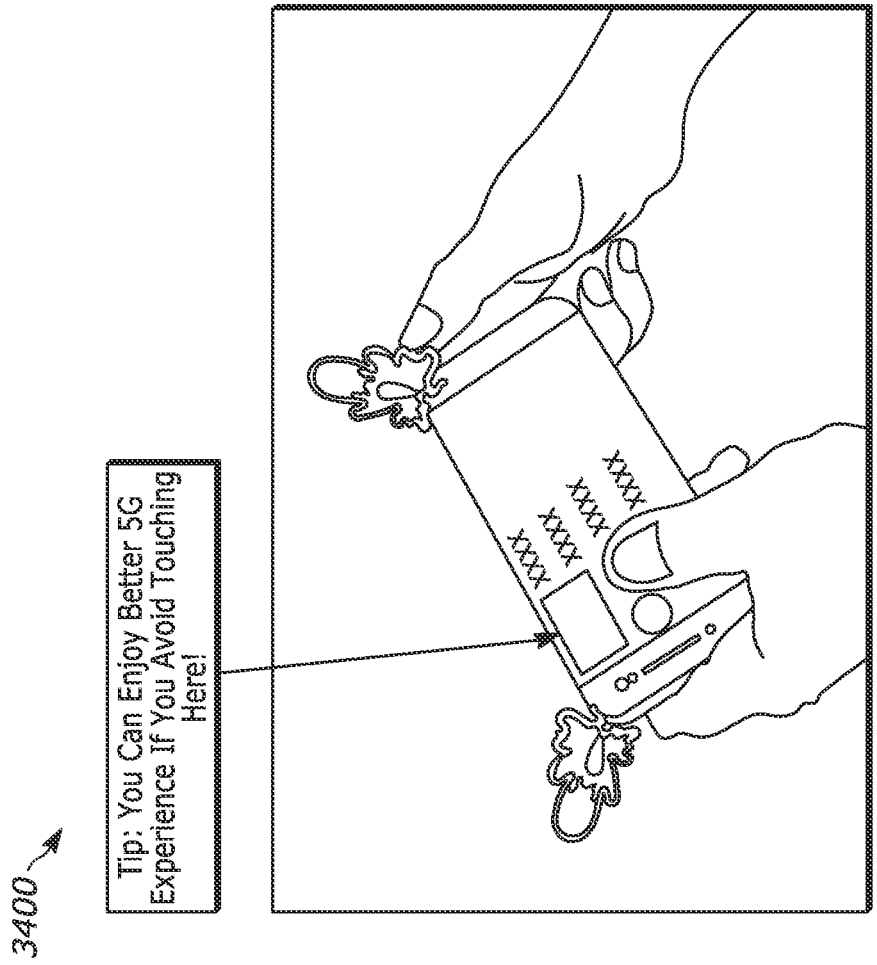
FIG. 34 illustrates an example message appears on screen requesting the user to move the hand/finger from undesirable location according to embodiments of the present disclosure.

FIG. 34 illustrates an example message 3400 appears on screen requesting the user to move the hand/finger from undesirable location according to embodiments of the present disclosure. The embodiment of the message 3400 illustrated in FIG. 34 is for illustration only. FIG. 34 does not limit the scope of this disclosure to any particular implementation.

The process can be terminated upon compliance by the user or upon acknowledgement by the user. For example, the pop-up message is removed if the user moves the finger or clicks an 'OK' button. Besides the displaying a message, other methods to discourage the user from the undesirable finger placement are also possible. For example, a sound can be emitted if the user is touching an area which results in signal loss greater than a threshold. In another example, a vibration is produced if the user is touching an area which results in signal loss greater than a threshold. In another example, visual guide as shown in FIG. 26, FIG. 29, and FIG. 32 can appear automatically to provide guidance to the user.

Although the present disclosure has been described with an exemplary embodiment, various changes and modifications may be suggested to one skilled in the art. It is intended that the present disclosure encompass such changes and modifications as fall within the scope of the appended claims.

None of the description in this application should be read as implying that any particular element, step, or function is an essential element that must be included in the claims scope. The scope of patented subject matter is defined only by the claims. Moreover, none of the claims are intended to invoke 35 U.S.C. § 112(f) unless the exact words "means for" are followed by a participle.

What is claimed is:

1. A user equipment (UE) in a wireless communication system, the UE comprising:
   a display; and
   a processor operably connected to the display, the processor configured to:
   provide an indicia, via the display, to indicate whether the UE is in a beam training condition;
   in response to indicating that the UE is in the beam training condition, perform a beam codebook training based on beam usage rate corresponding to beams of an antenna array of the UE; and
   generate a beam codebook for the beams of the antenna array of the UE for the beam training condition based on the beam usage rate, the beam codebook including a UE-specific sub-codebook.

2. The UE of claim 1, wherein the UE-specific sub-codebook comprises at least one codeword each of which is selected based on at least one of a usage rate, a signal strength, a signal-to-noise ratio (SNR), or a signal-to-interference-and-noise-ratio (SINR).

3. The UE of claim 1, wherein the processor is further configured to determine a size of the UE-specific sub-codebook based on a requirement of at least one of a beam sweeping latency or a spherical coverage performance.

4. The UE of claim 1, further comprising:
a sensor configured to sense a position of the UE, wherein the processor is further configured to indicate whether the UE is in the beam training condition based on the position of the UE that is identified from an input of the sensor.

5. The UE of claim 1, wherein the processor is further configured to:
indicate whether the UE is in the beam training condition based on an input from a user; and
identify a specific type of the beam training condition based on an indication that the UE is in the beam training condition.

6. The UE of claim 1, wherein the processor is further configured to:
receive an activation command from a user for an interactive user guide;
in response to receiving the activation command, calculate a level of signal strength based on sensing results of sensors; and
display, via the display, the level of signal strength for the interactive user guide.

7. The UE of claim 6, wherein the processor is further configured to, in response to receiving a deactivation command from the user, remove the displayed level of signal strength from the display.

8. A method of user equipment (UE) in a wireless communication system, the method comprising:
providing an indicia, via a display, to indicate whether the UE is in a beam training condition;
in response to indicating that the UE is in the beam training condition, performing a beam codebook training based on beam usage rate corresponding to beams of an antenna array of the UE; and
generating a beam codebook for the beams of the antenna array of the UE for the beam training condition based on the beam usage rate, the beam codebook including a UE-specific sub-codebook.

9. The method of claim 8, wherein the UE-specific sub-codebook comprises at least one codeword each of which is selected based on at least one of a usage rate, a signal strength, a signal-to-noise ratio (SNR), or a signal-to-interference-and-noise-ratio (SINR).

10. The method of claim 8, further comprising determining a size of the UE-specific sub-codebook based on a requirement of at least one of a beam sweeping latency or a spherical coverage performance.

11. The method of claim 8, further comprising:
sensing a position of the UE; and
indicating whether the UE is in the beam training condition based on the position of the UE that is identified from an input of a sensor.

12. The method of claim 8, further comprising:
indicating whether the UE is in the beam training condition based on an input from a user; and
identifying a specific type of the beam training condition based on indicating that the UE is in the beam training condition.

13. The method of claim 8, further comprising:
receiving an activation command from a user for an interactive user guide;
in response to receiving the activation command, calculating a level of signal strength based on sensing results of sensors; and
displaying, via the display, the level of signal strength for the interactive user guide.

14. The method of claim 13, further comprising, in response to receiving a deactivation command from the user, removing the displayed level of signal strength from the display.

15. A non-transitory computer readable medium comprising instructions, that when executed by at least one processor of a user equipment (UE), cause the UE to:
provide an indicia, via a display, to indicate whether the UE is in a beam training condition;
in response to indicating that the UE is in the beam training condition, perform a beam codebook training based on beam usage rate corresponding to beams of an antenna array of the UE; and
generate a beam codebook for the beams of the antenna array of the UE for the beam training condition based on the beam usage rate, the beam codebook including a UE-specific sub-codebook.

16. The non-transitory computer readable medium of claim 15 wherein the UE-specific sub-codebook comprises at least one codeword each of which is selected based on at least one of a usage rate, a signal strength, a signal-to-noise ratio (SNR), or a signal-to-interference-and-noise-ratio (SINR).

17. The non-transitory computer readable medium of claim 15, further comprising instructions, that when executed by the at least one processor, cause the UE to determine a size of the UE-specific sub-codebook based on a requirement of at least one of a beam sweeping latency or a spherical coverage performance.

18. The non-transitory computer readable medium of claim 15, further comprising instructions, that when executed by the at least one processor, cause the UE to:
control a sensor configured to sense a position of the UE; and
indicate whether the UE is in the beam training condition based on the position of the UE that is identified from an input of the sensor.

19. The non-transitory computer readable medium of claim 15, further comprising instructions, that when executed by the at least one processor, cause the UE to:
indicate whether the UE is in the beam training condition based on an input from a user; and
identify a specific type of the beam training condition based on an indication that the UE is in the beam training condition.

20. The non-transitory computer readable medium of claim 15, further comprising instructions, that when executed by the at least one processor, cause the UE to:
receive an activation command from a user for an interactive user guide;
in response to receiving the activation command, calculate a level of signal strength based on sensing results of sensors;
display, via the display, the level of signal strength for the interactive user guide; and
in response to receiving a deactivation command from the user, remove the displayed level of signal strength from the display.

* * * * *